(12) United States Patent
Franco Giese

(10) Patent No.: US 12,370,436 B2
(45) Date of Patent: Jul. 29, 2025

(54) HAND-HELD CONTROLLER

(71) Applicant: Nicolás Franco Giese, Bogotá (CO)

(72) Inventor: Nicolás Franco Giese, Bogotá (CO)

( * ) Notice: Subject to any disclaimer, the term of this patent is extended or adjusted under 35 U.S.C. 154(b) by 277 days.

(21) Appl. No.: 17/946,996

(22) Filed: Sep. 16, 2022

(65) Prior Publication Data

US 2023/0090962 A1    Mar. 23, 2023

Related U.S. Application Data

(60) Provisional application No. 63/261,353, filed on Sep. 18, 2021.

(51) Int. Cl.
*A63F 13/24*    (2014.01)

(52) U.S. Cl.
CPC ................... *A63F 13/24* (2014.09)

(58) Field of Classification Search
CPC ......... A63F 13/24; G06F 3/011; G06F 3/0317
See application file for complete search history.

(56) References Cited

U.S. PATENT DOCUMENTS

| | | | | |
|---|---|---|---|---|
| 4,955,714 A * | 9/1990 | Stotler | ........... | G09B 27/00 353/62 |
| 5,531,443 A | 6/1996 | Cruz | | |
| 5,551,701 A * | 9/1996 | Bouton | ........... | A63F 13/22 345/161 |
| 5,624,117 A * | 4/1997 | Ohkubo | ........... | A63F 13/24 463/37 |
| 6,891,527 B1 * | 5/2005 | Chapman | ........... | G06F 3/043 345/173 |
| 7,145,551 B1 * | 12/2006 | Bathiche | ........... | G06F 3/0346 345/158 |
| 7,931,535 B2 | 4/2011 | Ikeda et al. | | |
| 8,267,786 B2 | 9/2012 | Ikeda | | |
| 10,296,107 B2 | 5/2019 | Tao | | |
| 10,503,119 B2 * | 12/2019 | Kim | ........... | G03H 1/2249 |
| 10,525,340 B2 | 1/2020 | Muramatsu et al. | | |
| 10,773,155 B2 | 9/2020 | Muramatsu et al. | | |
| 10,894,208 B2 | 1/2021 | Bristol et al. | | |

(Continued)

OTHER PUBLICATIONS

Valve Controllers, Valve Corporation, retrieved Sep. 19, 2022 from https://www.valvesoftware.com/en/index/controllers.

(Continued)

*Primary Examiner* — Steve Rowland
(74) *Attorney, Agent, or Firm* — LYON & HARR LLP; Richard T. Lyon

(57) ABSTRACT

A hand-held controller configured to be grasped and operated with one hand. The hand-held controller serves as an alternative to the keyboard for giving input to videogames or other programs, and is generally used along with a mouse. The hand-held controller includes a plurality of input devices configured to be comfortably operated with the user's fingers when the hand-held controller is grasped. The hand-held controller is configured to be able to stand on a table or flat surface and includes interfaces for functioning without the need for any cables to be connected to it. The hand-held controller includes an input device configured to give direction input, and several input devices configured for giving input not related to direction. The input devices include different operation modes to be recognized by different gaming systems and programs.

17 Claims, 10 Drawing Sheets

(56) References Cited

U.S. PATENT DOCUMENTS

| | | | | |
|---|---|---|---|---|
| 2001/0045938 | A1* | 11/2001 | Willner | A63F 13/24 348/E5.103 |
| 2002/0089856 | A1* | 7/2002 | Vogel | F21V 3/02 362/284 |
| 2002/0103031 | A1* | 8/2002 | Neveu | A63F 13/537 463/49 |
| 2003/0216180 | A1* | 11/2003 | Shinohara | A63F 13/22 463/37 |
| 2004/0090416 | A1* | 5/2004 | Biheller | A63F 13/22 345/156 |
| 2005/0130742 | A1* | 6/2005 | Feldman | A63B 71/0622 235/380 |
| 2006/0040740 | A1* | 2/2006 | DiDato | A63F 13/42 463/7 |
| 2007/0202956 | A1* | 8/2007 | Ogasawara | A63F 13/24 463/46 |
| 2007/0293318 | A1* | 12/2007 | Tetterington | A63F 13/24 463/37 |
| 2008/0174550 | A1* | 7/2008 | Laurila | A63F 13/285 345/158 |
| 2009/0280899 | A1* | 11/2009 | Cox | A63F 13/45 463/40 |
| 2011/0081969 | A1* | 4/2011 | Ikeda | A63F 13/235 463/37 |
| 2012/0196680 | A1* | 8/2012 | Provitt | A63F 13/24 463/37 |
| 2018/0104574 | A1* | 4/2018 | Tager | A63F 13/20 |
| 2018/0260932 | A1* | 9/2018 | Gilquin | G06T 3/06 |
| 2019/0064993 | A1* | 2/2019 | Hardie-Bick | G06F 3/04883 |
| 2019/0089949 | A1* | 3/2019 | Ha | H04N 13/30 |
| 2022/0347561 | A1* | 11/2022 | Li | A63F 13/98 |

OTHER PUBLICATIONS

Playstation Move Navigation Controller, Amazon.com Inc., retrieved Sep. 20, 2022 from https://www.amazon.com/Playstation-Move-Navigation-Controller-3/dp/B00210K6X6.

FragFX FragChuck (PC/MAC), SplitFish Gameware, retrieved Sep. 20, 2022, https://world.splitfish.com/fragfx-game-controllers/fragfx-fragchuck-pc-mac.html.

\* cited by examiner

HAND-HELD CONTROLLER

BACKGROUND

Two of the most important and widely used gaming platforms are the personal computer (PC) and the console gaming platforms. There are numerous differences between these two platforms, but one of the most significant ones is the way that the user gives input or interacts with the videogame. On the PC gaming platform, the main form of giving input to videogames is through the combined use of a keyboard and a mouse. On the other hand, on gaming consoles, the main form of giving input to videogames is through the use of a two-handed controller.

SUMMARY

This Summary is provided to introduce a selection of concepts, in a simplified form, that are further described hereafter in the Detailed Description. This Summary is not intended to identify key features or essential features of the claimed subject matter, nor is it intended to be used as an aid in determining the scope of the claimed subject matter.

In one implementation, the hand-held controller described herein is operated with one hand of the user and provides input to a computerized machine that interfaces with and provides inputs to a video game running on a computing device. More particularly, the hand-held controller includes a housing configured to be grasped with one hand of the user. In addition, a directional input device accessible by the user is included on the exterior surface of the housing. The directional input device causes a signal indicative of a direction to be sent to a central controller whenever the user manipulates the directional input device in a manner indicative of a direction. There is also a plurality of video game input devices included that are accessible by the user on the exterior surface of the housing. Each of the video game input devices causes a signal indicative of the activation of that input device to be sent to the central controller whenever that input device is activated by the user. Further, there is at least one function-adding input device included that is accessible by the user on the exterior surface of the housing. Each function-adding input device included causes a signal indicative of the activation of that function-adding input device to be sent to the central controller whenever that function-adding input device is activated by the user. Whenever a function-added input device signal is received by the central controller while one or more of the video game input devices is activated, the central controller changes a prescribed video game action input signal associated with the activation of the one or more video game input devices to a different prescribed video game action input signal associated with the activation of the one or more video game input devices in conjunction with the activation of the function-adding input device corresponding to the received function-added input device signal. The aforementioned central controller, which interfaces with and provides video game input signals to the video game running on the computing device, receives activation signals and for each activation signal or coincident activation signals received, assigns a prescribed video game action input signal associated with the particular activation signal or coincident activation signals received. The central controller then sends the assigned video game action input signal to the computing device via one or more communication interfaces. In addition, the central controller receives direction signals and for each direction signal received, assigns a prescribed video game direction input signal associated with the particular direction signal received. The assigned video game direction signal is then sent to the computing device via one or more communication interfaces.

Although the foregoing hand-held controller implementation involves giving input to videogames, other implementations are not limited to that purpose. Since the hand-held controller can emulate a keyboard for certain operation modes, it may also be used in replacement of the keyboard to interact with other computer programs. In general, in one implementation, the hand-held controller is operated with one hand of a user and interfaces with and provides inputs to a computer program running on a computing device. More particularly, the hand-held controller includes a housing configured to be grasped with one hand of the user. A plurality of function input devices are included which are accessible by the user on the exterior surface of the housing. Each of the function input devices causes a signal indicative of the activation of that input device to be sent to the central controller whenever that input device is activated by the user. At least one function-adding input device is also included that is accessible by the user on the exterior surface of the housing. Each of function-adding input devices included causes a signal indicative of the activation of that function-adding input device to be sent to the central controller whenever that function-adding input device is activated by the user. Whenever a function-added input device signal is received by the central controller while one or more of the function input devices is activated, the central controller changes a prescribed function action input signal associated with the activation of the one or more function input devices to a different prescribed function input signal associated with the activation of the one or more function input devices in conjunction with the activation of the function-adding input device corresponding to the received function-added input device signal. The aforementioned central controller, which interfaces with and provides input signals to the computer program running on the computing device, receives activation signals and for each activation signal or coincident activation signals received, assigns a prescribed function input signal associated with the particular activation signal or coincident activation signals received. The central controller then sends the assigned function input signal to said computing device via one or more communication interfaces.

In yet another implementation, the hand-held controller described herein interfaces with and provides inputs to a computer program running on a computing device. More particularly, the hand-held controller includes a housing configured to be grasped by a user. In addition, a directional input device is included which includes a circuit board disposed within the housing and a user manipulable interface accessible by the user on the exterior surface of the housing. The directional input device causes a signal indicative of a direction to be sent to a central controller whenever the user manipulates the directional input device in a manner indicative of a direction. The directional input device is structurally independent from other components located on or within the housing, such that the directional input device can be removed and replaced without removing or compromising the other components. The central controller, which interfaces with and provides input signals to the computer program running on the computing device, receives direction signals and for each direction signal received, assigns a prescribed direction input signal associated with the particular direction signal received and sends the assigned direction signal to said computing device via one or more communication interfaces.

DESCRIPTION OF THE DRAWINGS

The specific features, aspects, and advantages of the hand-held controller implementations described herein will become better understood with regard to the following description, appended claims, and accompanying drawings where:

DETAILED DESCRIPTION

Figure 1A:
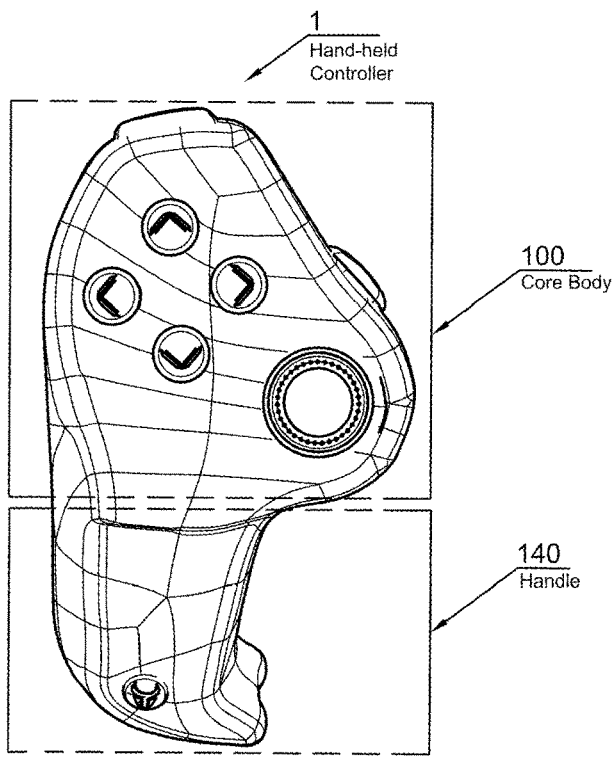
FIGS. 1A-B are diagrams illustrating two top views of an exemplary implementation, in simplified form, of the hand-held controller described herein.

In the following description reference is made to the accompanying drawings which form a part hereof, and in which are shown, by way of illustration, specific implementations in which a hand-held controller can be practiced. It is understood that other implementations can be utilized and structural changes can be made without departing from the scope of the hand-held controller.

It is also noted that for the sake of clarity specific terminology will be resorted to in describing the hand-held controller implementations described herein and it is not intended for these implementations to be limited to the specific terms so chosen. Furthermore, it is to be understood that each specific term includes all its technical equivalents that operate in a broadly similar manner to achieve a similar purpose. Reference herein to "one implementation", or "another implementation", or an "exemplary implementation", or an "alternate implementation", or "some implementations", or "one tested implementation"; or "one version", or "another version", or an "exemplary version", or an "alternate version", or "some versions", or "one tested version"; or "one variant", or "another variant", or an "exemplary variant", or an "alternate variant", or "some variants", or "one tested variant"; means that a particular feature, a particular structure, or particular characteristics described in connection with the implementation/version/variant can be included in one or more implementations of the hand-held controller. The appearances of the phrases "in one implementation", "in another implementation", "in an exemplary implementation", "in an alternate implementation", "in some implementations", "in one tested implementation"; "in one version", "in another version", "in an exemplary version", "in an alternate version", "in some versions", "in one tested version"; "in one variant", "in another variant", "in an exemplary variant", "in an alternate variant", "in some variants" and "in one tested variant"; in various places in the specification are not necessarily all referring to the same implementation/version/variant, nor are separate or alternative implementations/versions/variants mutually exclusive of other implementations/versions/variants. Yet furthermore, the order of process flow representing one or more implementations, or versions, or variants does not inherently indicate any particular order nor imply any limitations of the hand-held controller.

As utilized herein, the terms "component," "system," "client", "central controller" and the like can refer to a computer-related entity, either hardware, software (e.g., in execution), firmware, or a combination thereof. For example, a component can be a process running on a processor, an object, an executable, a program, a function, a library, a subroutine, a computer, or a combination of software and hardware. By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, to the extent that the terms "includes," "including," "has," "contains," and variants thereof, and other similar words are used in either this detailed description or the claims, these terms are intended to be inclusive, in a manner similar to the term "comprising", as an open transition word without precluding any additional or other elements. In addition, for the purposes of this description the various input devices (e.g., directional input device, video game input device, and function-adding input devices) may sometimes be collectively referred to as input devices. Further, at times, the input devices may also be referred to as buttons without implying any particular physical form.

1.0 Introduction

In general, the hand-held controller implementations described herein are configured to be comfortably grasped and operated with one hand of a user and provide an alternative to a keyboard for playing games on a personal computer. While the hand-held controller implementations described herein relate to a hand-held controller configured to provide input to a gaming system such as one operating on a personal computer, they could be adapted to provide input to a gaming console as well.

Implementations of the hand-held controller include a compact and ergonomic housing that is configured to be comfortably grasped with one hand and accommodates a plurality of input devices that can be comfortably operated with the user's fingers with minimal finger displacement and wrist movement required. The hand-held controller implementations further include interfaces for interacting with a gaming system and sending videogame input. The hand-held controller implementations further include a core body section, which includes a plurality of input devices; and a handle section, which provides a structure for the user to grip the hand-held controller, additional input devices, and a support structure which enables the hand-held controller to stand on a flat surface. The hand-held controller implementations also include capabilities for sending analog direction input; a plurality of operation input devices; and novel features that enable it to send a greatly increased number of operation inputs, enough to perform the in-game actions that would otherwise be performed by a keyboard, while still providing a compact device that can be comfortably held and operated with one single hand.

This novel controller provides users with a satisfactory replacement to the keyboard that enables them to enjoy videogames with both a mouse and a hand-held controller at the same time, and one that advantageously addresses their needs and does not require them to learn how to use a keyboard for giving videogame input. With this, users can interact with a gaming system by using a mouse with one hand and a controller-like device with the other hand.

The ability of the hand-held controller implementations described herein to replace a keyboard as the input to a PC when playing a videogame running on the PC has many advantages. For example, individuals that are familiar with using a two-handed controller when play videogames running on a gaming console do not have to learn how to use a keyboard when playing video games running on a PC. A keyboard employs a completely different mechanic of operation, which causes the transition from a controller to a keyboard challenging. For instance, the hand-held controller implementations described herein do not require a user to memorize which keyboard keys to press amongst a matrix of numerous, similarly looking keys; or look at the keyboard to ensure they are pressing the correct keys; or learn the WASD direction input method, which is the standard form of giving direction input on PC by pressing the W, A, S, and D (WASD) keys on a keyboard with the index, middle, and ring fingers. On the other hand, the hand-held controller implementations described herein operate in a manner similar to two-handed controllers and so do not require learning a completely different mechanic of operation. In addition, the hand-held controller implementations described herein are comfortable and ergonomic to hold and operate, thereby preventing stress and strain on a user's hand and wrist.

The hand-held controller implementations described herein are also advantageous as they can be used in conjunction with a mouse when playing a videogame running on the PC. A mouse is considered to be superior to controllers as an input method for aiming in videogames, as it is well known in the videogaming industry. Using a controller alone would put a user at a disadvantage when playing against opponents who are using a mouse. Thus, it is desirable to use a mouse with one hand and a hand-held controller as described herein with the other hand.

Another advantage of the hand-held controller implementations described herein is the analog direction input. For instance, some hand-held controller implementations described herein input direction commands by moving an analog stick device with only the thumb. One of the main advantages of playing with a controller is using a joystick that can provide analog direction input and, therefore, analog in-game movement. With an analog input method like a joystick, the user is able to input progressive turns of a virtual car or move a virtual character in any direction, among other things.

Yet another advantage of the hand-held controller implementations described herein is that the controller can execute enough different input actions (e.g., 20+) that all the required in-game actions that are typically performed by a keyboard can be performed using the controller. This is important because some current videogames require the user to perform more than 15 different in-game actions (apart from sending direction input).

Still another advantage of the hand-held controller implementations described herein is the protrusion on the back of the handle that allows it to stand.

2.0 Hand-Held Controller

The hand-held controller 1 serves as a peripheral device to give input to a gaming system. The gaming system is capable of running and executing a program like, for example, a videogame, with which the user interacts by operating the hand-held controller 1. The gaming system may be a personal computer (PC); a gaming console; a smartphone, or other systems capable of running and executing a video game and receiving input from the hand-held controller 1.

The hand-held controller 1 is configured to be held and operated by one hand and allows the user to send input to a gaming system by operating a controller-like device. With this, the user can interact with a videogame by operating a controller-like device with one hand and a mouse with the other hand instead of operating a keyboard with one hand and a mouse with the other hand. The hand-held controller 1 provides users with the ability to send analog direction input, a compact housing configured to be grasped and operated with one hand, and enough input operation actions to perform the required in-game actions that would otherwise be performed by a keyboard.

Figure 1B:
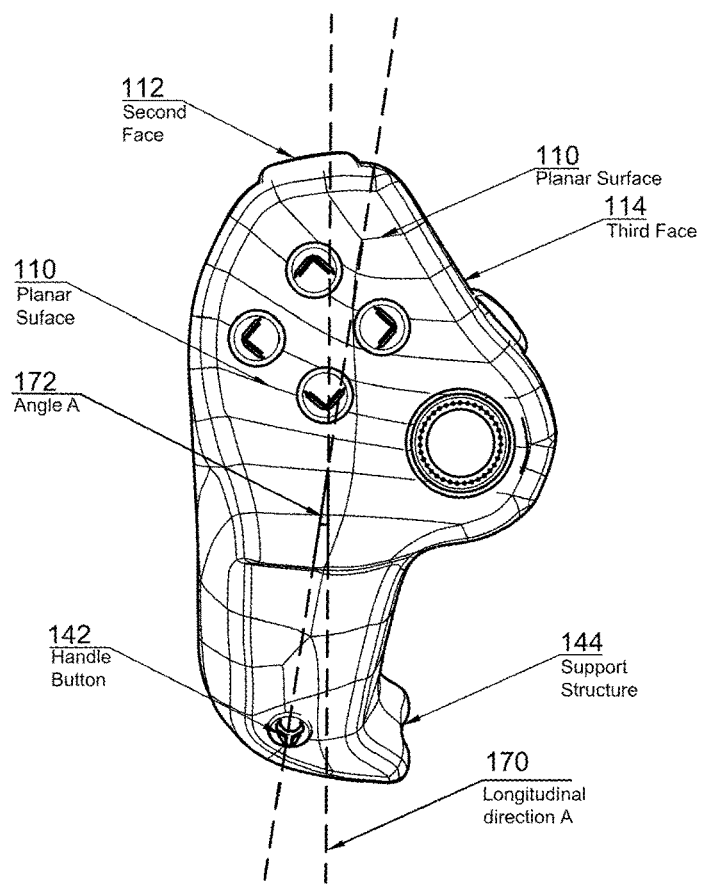
Figure 3A:
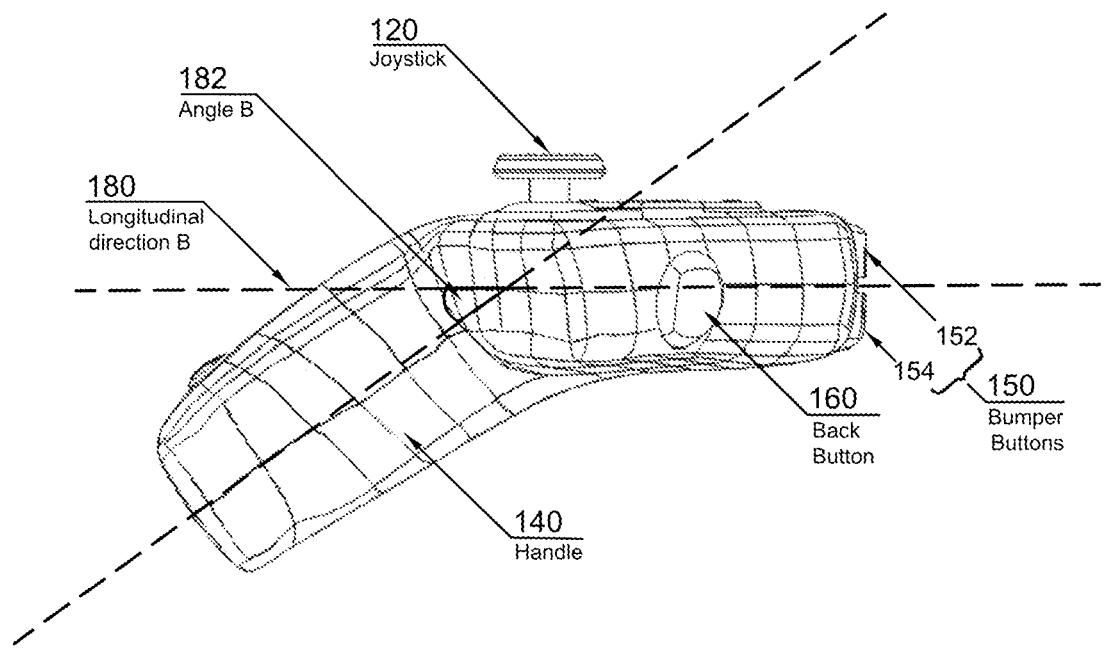
FIGS. 3A-B are diagrams illustrating two views from opposite sides of an exemplary implementation of the hand-held controller.
Figure 3B:
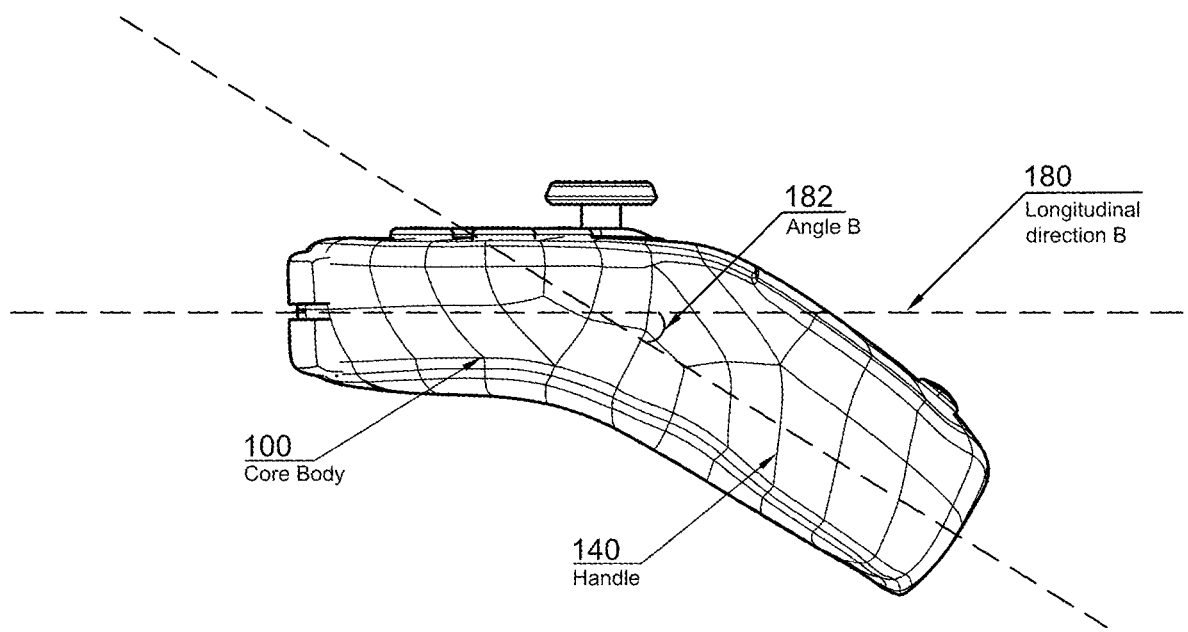
Figure 8:
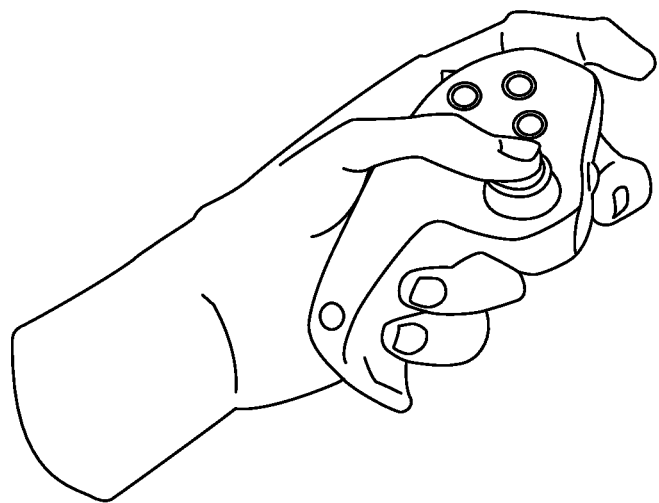
FIG. 8 is a diagram illustrating a perspective view of an exemplary implementation of the hand-held controller shown being grasped by the left hand of a user.

In one implementation, the hand-held controller 1 includes housing formed from a core body 100 and a handle 140, as shown in FIGS. 1A-B. The core body 100 is located at the front part of the hand-held controller's 1 housing and has an irregular and ergonomic shape. The core body 100 is configured to be comfortably grasped with one hand of the user and includes a plurality of video game input devices configured to be comfortably operated with the user's thumb, index, and middle fingers. A handle 140 protrudes from the core body 100 towards the rear part of the controller. The handle 140 may protrude from the core body 100 at an angle A 172 relative to a longitudinal direction A 170, which travels along the core body 100 from a top view, as shown in FIGS. 1A-B. The handle 140 may also protrude from the core body 100 at an angle B 182 relative to a longitudinal direction B 180 that travels along the core body 100 from a side view, as shown in FIGS. 3A-B. An example perspective view of hand-held controller 1 being grasped by a user's left hand is shown in FIG. 8. The handle 140 is configured to be grasped by the user's hand with the little and ring fingers or, optionally, with the little, ring, and middle fingers, according to the user's preference. The handle 140 has a cylindrical and rounded shape as to be comfortably gripped with the user's fingers. The core body 100 and handle 140 are the main parts that compose the housing of the controller. In one implementation, the hand-held controller's 1 housing may be made of engineering plastic such as injection molded acrylonitrile butadiene styrene (ABS), 3D printing plastic such as polyethylene terephthalate glycol (PETG) or polylactic acid (PLA), or other suitable materials such as metal. The hand-held controller's 1 housing may be manufactured by methods of injection molding, 3D printing, or other suitable manufacturing methods.

Figure 2A:
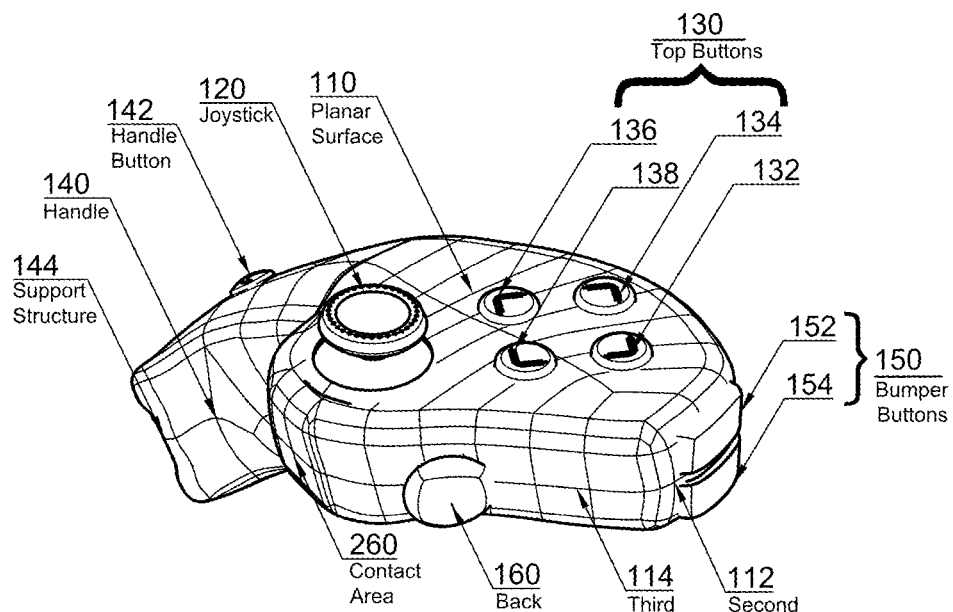
FIGS. 2A-B are diagrams illustrating two perspective views from different points of view, of an exemplary implementation of the hand-held controller.
Figure 2B:
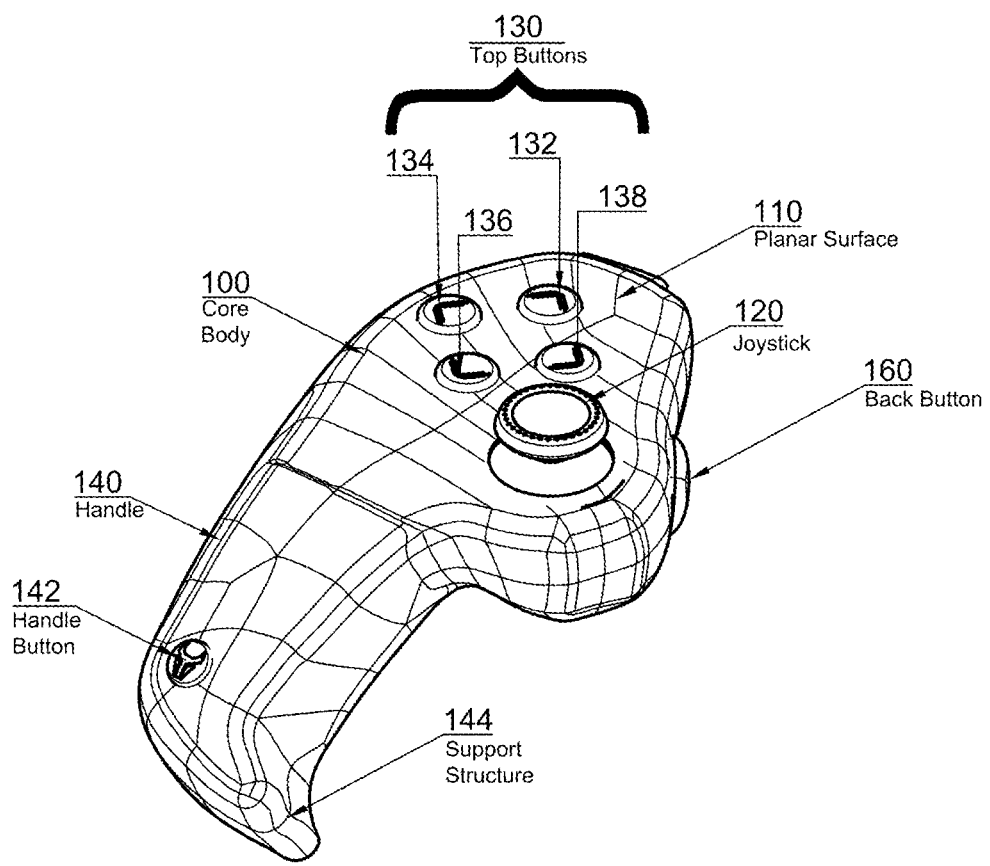

In one implementation, the top part of the core body 100 is a planar surface 110 that includes a plurality of input devices, as shown in FIGS. 2A-B. In one implementation, the planar surface 110 includes two input devices that are positioned to be comfortably operated by the user's thumb when the hand-held controller 1 is grasped by the user's hand, although not limited thereto. The planar surface 110 may include fewer or additional input devices. The planar surface 110 faces up when the hand-held controller 1 is grasped by the user, as shown in FIG. 8.

The planar surface 110 includes a first input device that serves for sending direction input. Through its operation, the user can send direction input and, for example, move a character in a virtual three-dimensional space. In one implementation, the first input device is a directional input device such as the joystick 120 located towards the right side of the planar surface 110, as shown in FIGS. 2A-B. Nonetheless, the first input device is not limited thereto. The first input device could be a different type of device suitable for providing direction input and could be located on the upper-left portion of the planar surface 110. The joystick 120 includes a push button device that the user can operate by pressing down the joystick 120 with their thumb. The joystick input device is not described in detail as it is well-known and publicly available.

Figure 4A:
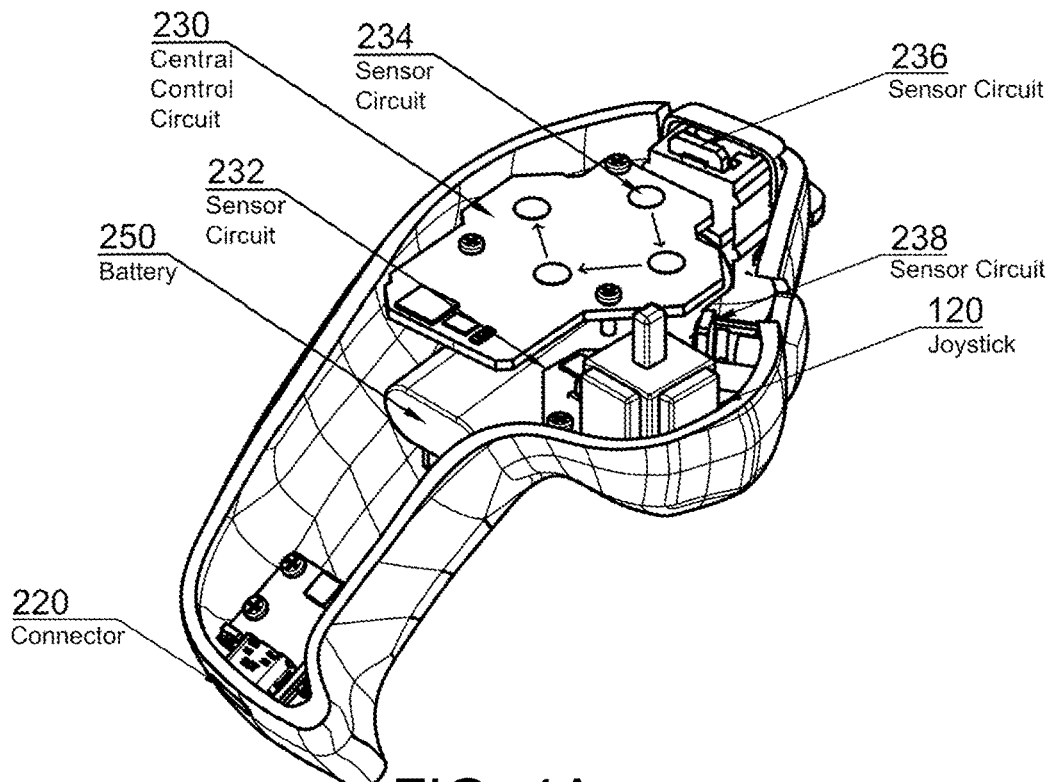
FIGS. 4A-B are diagrams illustrating two perspective top views from opposite points of view of an exemplary implementation of the hand-held controller with the top portion removed to show the controller's internal components.
Figure 4B:
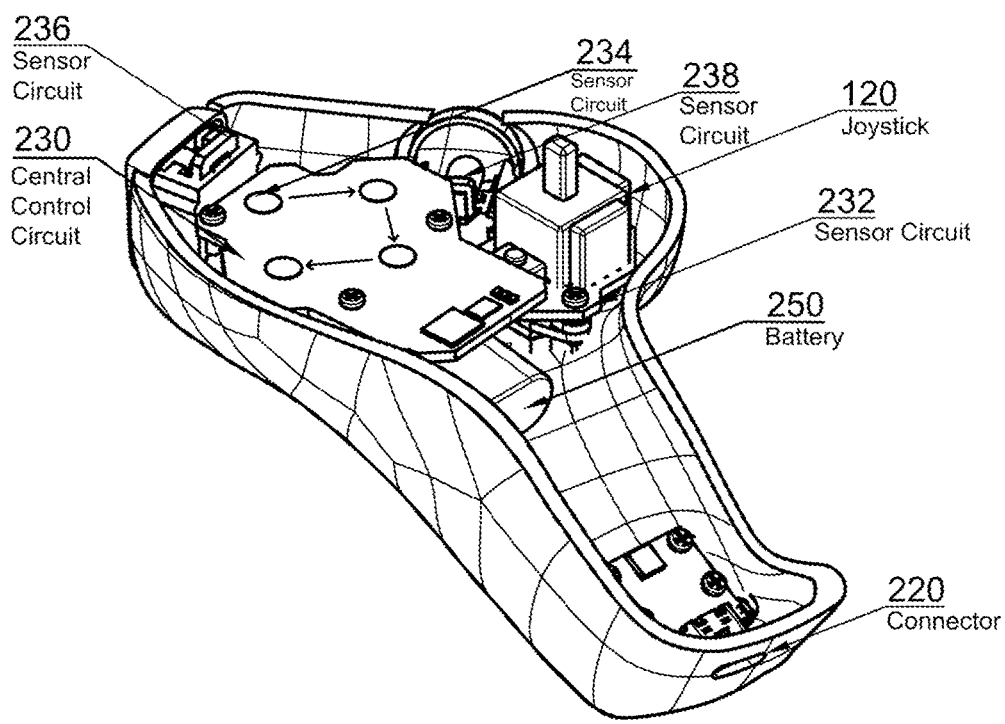

A sensor circuit 232 is included underneath the joystick 120, as shown in FIGS. 4A-B. The sensor circuit 232 may be a digital, analog, or mixed signal circuit to receive signals when the joystick 120 is operated by the user. When the joystick 120 is tilted by the user, a signal in the sensor circuit 232 that corresponds to the direction and amount of inclination of the joystick 120 is generated, indicating that the joystick 120 has been operated by the user and triggering a corresponding response to the game.

In one implementation, the joystick 120 includes two different operation modes and is configured to send analog direction input or digital direction input depending on the operation mode it is set to. In the first operation mode, the joystick 120 is configured to send analog direction input. In this operation mode, the joystick may be recognized by the gaming system as a controller's analog stick, receiving an analog direction signal. This allows the user to provide analog direction input by operating the joystick 120 input device. With the first operation mode, the user can provide direction input in any direction and with progressive increments of magnitude, which are determined by the direction and amount of inclination of the joystick 120, respectively. The first operation mode addresses the user's desire to be able to provide analog direction input by operating an analog stick instead of providing digital direction such as would be the case when operating a keyboard. The first operation mode may be generally used for games that recognize controller input, in which a controller analog stick is recognized, and the user is able to send analog direction input.

However, some video games are unable to recognize controller input and, therefore, unable to recognize the controller analog direction signal that the first mode of operation provides. For this reason, a second mode of operation is provided. In the second mode of operation, the joystick 120 is configured to send digital direction input. Instead of being recognized as a controller's joystick and providing controller control signals, the joystick 120 is recognized as a keyboard and provides keyboard control signals to the gaming system. In the second mode of operation, the joystick 120 emulates a keyboard and its input is recognized by the gaming system as keyboard input. The gaming system recognizes that a keyboard is being operated by the user, although it's in fact the hand-held controller 1 being operated. In this case, the WASD keyboard keystrokes, or any preferred by the user, are sent to the gaming system in accordance to the operation of the joystick 120. In this way, the user can send keyboard stroke signals by operating a joystick 120 device and provide direction input with a joystick 120 as if it was a keyboard being operated. Although the second mode of operation doesn't provide analog direction input, it's useful for playing video games that are unable to recognize controller input, in which the first operation mode is unusable.

In one implementation, the user may configure the joystick 120 to the first or second operation mode through a provided host application executed in the gaming system. The user may also toggle between the joystick 120 operation modes by pressing and holding certain buttons of the hand-held controller 1 for a certain amount of time, although the way in which the user may toggle the joystick 120 operation mode is not limited thereto. As an example, the user may press the joystick 120 push button and the top button 136 for 5 or more seconds to toggle between the joystick operation modes. This function allows the user to easily change the operation mode of the joystick 120 input device as desired.

The configuration of the joystick 120 is not limited to the aforementioned two operation modes. The joystick 120 may have additional or fewer operation modes. For example, the joystick 120 may further include a mouse operation mode, in which a mouse signal would be sent to the gaming system by operating the joystick 120 device, and the gaming system would recognize that a mouse is sending the signal even though the user is in fact operating the hand-held controller 1.

In one implementation, the joystick 120 and its sensor circuit 232 are structurally independent from all of the other electronic components, as shown in FIGS. 4A-B. Instead of being part of the same circuit board as the other components, the joystick 120 and its sensor circuit 232 are located on an independent circuit board which may be connected to a main circuit board with cables such as a flat flexible cable, for example. With this configuration, the joystick 120 and its circuit board can be easily removed from the hand-held controller 1 without removing or compromising any other components. This enables users to replace the joystick 120 circuit board for a new replacement unit, which may be sold separately from the hand-held controller 1, without having to tamper with or remove any of the other components. The joystick replacement board comes pre-assembled and only requires the user to disconnect the damaged unit, remove the screws, remove the damaged unit, insert the replacement unit, tighten the screws, and connect the new unit.

The foregoing joystick feature is advantageous. One issue that users commonly face with gaming controllers is known as joystick drift, which is the erroneous sending of input data from the joystick even when it is not being tilted or operated by the user. This phenomenon generally occurs due to the deterioration of internal components of the joystick modules through extensive use or completion of normal life cycles, causing incorrect readings and the sending of incorrect input values. Joystick drift severely detriments the gaming experience and causes great frustration to users. This foregoing joystick replacement feature is beneficial to users because it provides them with a convenient way of fixing the joystick drift issue by simply replacing the joystick module rather than having to de-solder the joystick module and solder a new unit, which is not possible for the average user; or to replace the controller's whole circuit board for a new one, which is not only costly and wasteful when only a single component is damaged, but also complicated, as it is greatly difficult if not impossible to obtain genuine replacement parts; or send the controller unit back for repair or buy a whole new controller. By saving them cost, time, and trouble that it typically takes to fix joystick failures, this solution makes the joystick drift issue much less troublesome for users.

The planar surface 110 further includes a second input device. Unlike the first input device, the second input device is not for sending direction input, as that is already provided by the first input device. Considering the need to provide enough input devices so the user can fully replace those offered by a keyboard, which need to be accommodated in a compact device, a second direction input device would be redundant and a misuse of space. Instead, the second input device provides a plurality of input operation devices referred to hereafter as video game input devices, such as buttons, which allow the user to perform in-game actions that would otherwise be performed by a keyboard such as jumping, reloading, crouching, etc.

In one implementation, the second input device may be located on the upper-left side of the planar surface 110. The second input device may be a set of top buttons 130, as shown in FIGS. 2A-B. The top buttons 130 include a plurality of operation buttons positioned to be comfortably operated by the user's thumb while the hand-held controller 1 is grasped by the user. In one implementation, the top buttons 130 may include four push buttons 132, 134, 136, and 138, which may be of an equal size and shape, disposed in an up, down, left, and right cross shape, as depicted in FIGS. 2A-B. The second input device is not limited to such type of input device, number, size, shape, and/or disposition. The second input device could be, for example, mechanical keys, a d-pad, or other suitable input device that allows the user to perform in-game actions, although not for sending direction input.

A sensor circuit 234 is included, as shown in FIGS. 4A-B. The sensor circuit 234 may be a digital, analog, or mixed signal circuit to receive signals when the top buttons 130 are operated by the user. The sensor circuit 234 may, for example, include an open circuit underneath each of the buttons 132, 134, 136, and 138. When a button 132, 134, 136, or 138 is pressed by the user, a conductive surface becomes in contact with the corresponding open circuit, shorting it and generating a signal in the form of voltage or current in the sensor circuit 234, indicating that the button has been pressed by the user and triggering a corresponding response to the game.

In one implementation, the hand-held controller 1 includes a second face 112, which is perpendicular to the planar surface 110 and located towards the front part of the core body 100, as shown in FIGS. 2A-B. The second face 112 includes a third input device that is configured to be operated by the user's index and middle fingers while the hand-held controller 1 is grasped by the user. Like the second input device, the function of the third input device is sending input signals not related to direction input. Instead, the third input device provides one or more operation devices, such as buttons, that allow the user to perform in-game actions such as jumping, crouching, reloading, etc.

In one implementation, the third input device is a set of bumper buttons 150. The set of bumper buttons 150 is a plurality of operation buttons positioned to be comfortably operated by the index and/or middle fingers when the controller is grasped by the user's hand. In one implementation, the bumper buttons 150 include two rectangular and similarly shaped buttons 152 and 154. The bumper button 152 is located above the bumper button 154, as shown in FIGS. 2A-B. The user may operate the bumper buttons by pressing them with the index finger. The bumper buttons 150 are configured so that the user can press both at the same time with their index finger. Optionally, the user can press the upper bumper button 152 with their index finger and the lower bumper button 154 with their middle finger if desired. The third input device is not limited to such type of input device, number, size, shape, and/or disposition. In alternative implementations, the third input device may, for example, include an analog trigger, a different number of operation devices configured in a different disposition, and/or send an analog signal instead of a digital signal.

A sensor circuit 236 is included, as shown in FIGS. 4A-B. The sensor circuit 236 may be a digital, analog, or mixed signal circuit to receive signals when the bumper buttons 150 are operated by the user. The sensor circuit 236 may, for example, include an open circuit underneath each of the bumper buttons 152 and 154. When a bumper button 152 or 154 is pressed by the user, a conductive surface becomes in contact with the corresponding open circuit, shorting it and generating a signal in the form of voltage or current in the sensor circuit 236, indicating that the button has been pressed by the user and triggering a corresponding response to the game.

In one implementation, the top buttons 130, the bumper buttons 150, and the joystick 120 push button have two different operation modes: a first operation mode and a second operation mode. The first operation mode is a controller operation mode. In the first operation mode, the signals generated by the operation of the top buttons 130, the bumper buttons 150, and the joystick 120 push button are controller signals and are recognized by the gaming system as controller signals. In this operation mode, the gaming system recognizes that a controller is sending input signals. In the first operation mode, the result of operating the button 132, 134, 136, 138, 152, 154, or the joystick 120 push button in the hand-held controller 1 is that the gaming system recognizes that a controller button has been operated by the user. The second operation mode is a keyboard operation mode. In the second operation mode, the signals generated by the operation of the top buttons 130, the bumper buttons 150, and the joystick 120 push button are keyboard signals and are recognized by the gaming system as keyboard signals. In this operation mode, the gaming system recognizes that a keyboard is sending input signals. In the second operation mode, the result of operating the button 132, 134, 136, 138, 152, 154, or the joystick 120 push button in the hand-held controller 1 is that the gaming system recognizes that a keyboard key has been pressed by the user and is the same as if a keyboard was being operated by the user. With this, the user can send keyboard input by operating the hand-held controller 1. The first operation mode may be generally used for games that recognize controller input, in which controller button signals are recognized and the user is able to send game input by operating the top buttons 130, the bumper buttons 150, and/or the joystick 120 push button when configured to the first operation mode. The second mode of operation may be used for games that do not recognize controller input but do recognize keyboard input, in which case the user is able to send game input by operating the top buttons 130, the bumper buttons 150, and/or the joystick 120 push button when configured to the second operation mode.

The configuration of the top buttons 130, the bumper buttons 150, and the joystick 120 push button is not limited to the aforementioned two operation modes. The top buttons 130, the bumper buttons 150, and the joystick 120 push button may have additional or fewer operation modes. For example, the top buttons 130, the bumper buttons 150, and the joystick 120 push button may further include a mouse button operation mode, in which a mouse button signal would be sent to the gaming system by operating the top buttons 130, the bumper buttons 150, or the joystick 120 push button, and the gaming system would recognize that a mouse is sending the signal even though the user is in fact operating the hand-held controller 1.

In one implementation, the user may configure the top buttons 130, the bumper buttons 150, and the joystick 120 push button to the first or second operation mode through a provided host application executed in the gaming system. The user may also toggle between operation modes by pressing and holding certain buttons of the hand-held controller 1 for a certain amount of time, although the way in which the user may toggle operation modes is not limited thereto. As an example, the user may press the top buttons 134 and 138 for 5 or more seconds to toggle between the button operation modes. This function allows the user to easily change between operation modes of the buttons as desired. Further, through a provided host application executed in the gaming system and when the top buttons 130, the bumper buttons 150, and the joystick 120 push button are configured to the second operation mode, the user may map each of the buttons 132, 134, 136, 138, 152, 154, or the joystick 120 push button, or others that may be included in the hand-held controller 1, to any keyboard key that they desire. For example, the user may map the top button 132 to the keyboard key "R". In this case, the user may operate the top button 132 and the gaming system would recognize that the keyboard key "R" is being pressed on the keyboard.

It is important to note that the joystick 120 operation modes, as well as the top buttons 130, the bumper buttons 150, and the joystick 120 push button operation modes are independent. This means that the joystick 120 can be set to the first or second operation mode independently of which mode the top buttons 130, the bumper buttons 150, and the joystick 120 push button are set to operate. For example, the joystick 120 may be set to its first operation mode while the top buttons 130, the bumper buttons 150, and the joystick 120 push button may be set to their second operation mode. However, the operation modes of the top buttons 130, the bumper buttons 150, and the joystick 120 push button covers all of them, meaning that the top buttons 130, the bumper buttons 150, and the joystick 120 push button are always in the same operation mode, e.g., either the first operation mode or the second operation mode.

In one implementation, the hand-held controller 1 includes a third face 114, which is perpendicular to the planar surface 110 and is located towards the upper-right side of the core body 100, as shown in FIGS. 1A-B and FIGS. 2A-B. The third face 114 includes a fourth input device. In one implementation, the fourth input device is a back button 160. The back button 160 may be located on the lower part of the third face 114 and near the back of the controller, as shown in FIGS. 3A-B. The back button 160 is positioned so that it can be easily reached and operated by the user's middle finger when the hand-held controller 1 is grasped, as shown in FIG. 8. The back button 160 may be of a circular shape. However, the fourth input device is not limited to such type of input device, number, size, shape, and/or disposition. In alternative implementations, the fourth input device may, for example, include a plurality of buttons instead of one, and be of a different size and/or shape.

Although the fourth input device is depicted on the third face 114 in FIGS. 2A-B, the fourth input device may be located on the upper portion of the handle 140, near the joystick 120, in alternative implementations. In this case, the fourth input device may be operated by the middle finger of the user's hand when the controller's handle 140 is gripped by the little, ring, and middle fingers of the user.

A sensor interface circuit 238 is included, as shown in FIGS. 4A-B. The sensor circuit 238 may be a digital, analog, or mixed signal circuit to receive signals when the back button 160 is operated by the user. The sensor circuit 238 may, for example, include an open circuit underneath the back button 160. When the back button 160 is pressed by the user, a conductive surface becomes in contact with the open circuit, shorting it and generating a signal in the form of voltage or current in the sensor circuit 238, indicating that the back button 160 has been pressed by the user and triggering a corresponding response to the game.

The back button 160 is one of the things that make the hand-held controller implementations described herein unique. It provides an extra input device on the back of the controller, which the user can operate with the middle finger, in addition to the standard front bumper buttons and top buttons. This additional input device benefits the user by increasing the total number of input signals that they can provide. The back button 160 allows the user to deploy the middle finger for giving an additional input instead of simply using it to grip or give support to the hand-held controller 1.

Not only is the inclusion of the fourth input device novel, but also its function. One of the advantages of the hand-held controller implementations described herein is to provide enough video game input devices that enable the user to perform all of the in-game actions that would otherwise be performed with a keyboard, while providing an analog direction input device and a compact and ergonomic housing that is configured to be grasped and operated with only one hand. For this, instead of sending an input signal that allows the user to perform an in-game action, like the other buttons 132, 134, 136, 138, 152, 154, and the joystick 120 push button do, the back button 160 serves to give a secondary function to all of the other buttons, increasing the amount of in-game actions that the user can perform with them. As mentioned before, each of the other buttons can perform a first function when pressed or operated by the user, which triggers a response to the game like, for example, an in-game action. However, when the back button 160 is pressed, each of the other buttons acquires a new secondary function, which is different from the first function. This allows a single button to perform two different in-game actions. For example, the top button 132 may be configured to send a first signal that is assigned to the in-game action of jumping. This action would be triggered when the top button 132 is pressed by the user. With use of the back button 160, the top button 132 may also be configured to send a second signal that is assigned to a different in-game action, like reloading. This action would be triggered when the top button 132 is pressed while the back button 160 is pressed. This special function means that the hand-held controller 1 is able to send twice as many input signals with the same number of buttons, as it allows each button to send two different signals instead of one. This feature is highly beneficial to the user because it significantly increases the number of inputs that they can provide by operating the hand-held controller 1 in replacement of the keyboard. This allows the user to perform the in-game actions that would otherwise be performed by a keyboard.

In one implementation, by use of an included host application, the user may optionally configure the back button 160 to operate as a regular button and give an input operation like the other buttons, if so desired, instead of serving to give an additional function to the other buttons. For example, the back button 160 may be configured to give game input with which the user may perform in-game actions in the same way that can be done with the buttons 132, 134, 136, 138, 152, 154 and the joystick 120 push button. In this case, the back button behaves like the buttons 132, 134, 136, 138, 152, 154 and the joystick 120 push button, operates in the operation mode these are set to, and doesn't provide an additional function to the other buttons.

Although the back button 160 can act as a function-adding button because it can be easily pressed at the same time as any of the other buttons, in one implementation, optionally, and by use of an included host application, the user may configure any of the buttons 132, 134, 136, 138, 152, 154 and/or the joystick 120 push button, or other input devices that may be included in the hand-held controller 1, to function as a function-adding button like the back button 160. For instance, the user may configure the bumper button 152 to act as a function-adding button that, when pressed, gives an additional function to the other input devices or buttons instead of providing game input to perform an in-game action. For example, if the user configures the bumper button 152 to act as a function-adding button, the user may perform an in-game action by pressing the top button 132, and a different in-game action by pressing the top button 132 while the bumper button 152 is pressed. The user may configure one or more buttons to act as function-adding buttons. Each button configured as a function-adding button serves to give an additional function, which is different from the function that other function-adding buttons give, to each of the buttons. For example, if the bumper button 152 and the back button 160 are configured as function-adding buttons, the user may perform a first in-game action by pressing the top button 132 alone, a second in-game action by pressing the top button 132 while the bumper button 152 is pressed, and a third in-game action by pressing the top button 132 while the back button 160 is pressed. Where the first, second, and third in-game actions are different.

In one implementation, the fourth input device may include a plurality of input devices or buttons instead of a single back button 160. In this case, each of the input devices included in the fourth input device, which are configured to be operated by the user's middle finger, may have a function of giving additional functions to the other buttons 132, 134, 136, 138, 152, 154 and the joystick 120 push button, or other input devices that may be included in the hand-held controller 1, like the back button 160 does. In this case, each of the other buttons 132, 134, 136, 138, 152, 154, and the joystick 120 push button, or other input devices that may be included in the hand-held controller 1, may have an additional function for each function-adding button included in the fourth input device. For example, in an implementation where the fourth input device includes two different function-adding buttons, each of the buttons 132, 134, 136, 138, 152, 154, and the joystick 120 push button, or other input devices that may be included in the hand-held controller 1, would have a first function when operated, a second function when operated while one of the input devices included in the fourth input device is pressed, and a third function when operated while the other input device included in the fourth input device is pressed. Optionally, in alternative implementations, one or more of the input devices included in the fourth input device may be configured to operate like a regular button serving to give game input and perform an in-game action instead of giving an additional function to the other input devices.

In one implementation, any of the previously described buttons that act as a function-adding button (e.g., the back button 160) can also act as a normal button at the same time. For example, in one implementation, when a function-adding button is activated without concurrently activating one or more of the video game input devices, it acts as a video game input device. In this sense, in one implementation, all the video game input devices, as well as the directional input device (such as the joystick) when also configured as a video game input device, can act as function-adding input devices.

In one implementation, the hand-held controller 1 includes another novel feature that allows the user to perform even more in-game actions with the same number of buttons. This feature is the ability to send new input signals by performing combo button presses with buttons that are not configured as function-adding buttons or, in other words, by pressing two or more buttons that are not configured as function-adding buttons at the same time. By pressing two or more buttons at the same time, a new input signal, which is different from the signals that correspond to the individual presses of such buttons, can be sent. For example, pressing the bumper button 152 sends a signal that corresponds to the operation of that particular button and triggers a game response like, for instance, crouching. Moreover, pressing the bumper button 154 sends a signal that corresponds to the operation of that particular button and triggers a game response like, for instance, jumping. With the combo press function, a new signal, which is different from the corresponding signals of pressing the bumper buttons 152 and 154 individually, would be sent upon pressing bumper buttons 152 and 154 at the same time. This new signal may perform a different in-game action other than jumping or crouching. With this, the user is able to send three different inputs, or perform three different in-game actions, with the use of only two buttons.

In addition, in one implementation, the combo button press function can be paired with a function-adding button (e.g., the back button 160). This means that pressing the bumper buttons 152 and 154 at the same time, while the back button 160 is pressed, yields the sending of yet a new signal, which is different from the signal that corresponds to pressing only the bumper buttons 152 and 154 at the same time. In combination, these two functions allow the user to send 6 different inputs and thus perform 6 different in-game actions with the use of the two bumper buttons 152 and 154 and the back button 160. The user can perform two actions by pressing the bumper buttons 152 and 154 individually, two other actions by pressing the bumper buttons 152 and 154 individually while the back button 160 is pressed, another action by pressing the bumper buttons 152 and 154 at the same time, and another action by pressing the bumper buttons 152 and 154 at the same time while the back button 160 is pressed.

The foregoing example has been made with the purpose of exemplification and the combo press function may be performed by pressing different sets of buttons. In one implementation, a host application is included that allows the user to configure which specific buttons can perform a combo press when pressed at the same time. With this, the user is able to decide and configure which combo presses he or she wishes to perform and assign the configured input signals to specific in-game actions. The ability to configure which buttons perform combo button presses together and which buttons function as function-adding buttons gives the user freedom to configure the hand-held controller 1 in a way that harmonizes with their particular needs and preferences.

In one implementation, with the novel features of having a back button 160 that serves as a function-adding button and combo button presses, the hand-held controller is able to provide both a compact device that can be comfortably held and operated with one hand and the ability to send a large number of input operations. With these features and by using the buttons in combination, the user is able to perform far more in-game actions than it would be possible with single-function input devices. With these features, and further including the ability to send analog direction input, the user is able to perform more than 20 different in-game actions and send analog direction input with one hand. This allows users to effectively perform the in-game actions that would otherwise be performed with a keyboard and makes the hand-held controller 1 a significantly improved alternative to the keyboard.

In one implementation, the hand-held controller 1 includes a fifth input device. The fifth input device may be a handle button 142 located on the rear part of the handle's 140 top face, as shown in FIGS. 2A-B. The handle button 142 may serve for configuration or other secondary purposes. Unlike the other input devices, the fifth input device is not for giving direction input, performing in-game actions, or giving additional functions to other input devices. Instead, the handle button 142 may serve to turn the hand-held controller 1 or on off, switch profiles, toggle between the different input device operation modes, or other configuration related purposes. The handle button 142 may perform different functions by different ways of operation like long presses, double presses, single presses, or other variations. For example, the handle button 142 may turn the hand-held controller 1 on or off when continuously pressed for three or more seconds; and cycle through different button-to-key assignment profiles when pressed two times in rapid succession. The handle button 142 may also be pressed in combination with other input devices, such as the top button 132, to toggle input methods, select a specific button-to-key assignment profiles, or other configuration purposes. The user may operate the handle button 142 by using their right hand while the hand-held controller 1 is grasped by their left hand. Optionally, the user may operate the handle button 142 with their left hand's thumb while the hand-held controller 1 is grasped by the left hand.

Although not depicted in the drawings, a sensor interface circuit associated with the handle button 142 is included. This sensor circuit may be a digital, analog, or mixed signal circuit to receive signals when the handle button 142 is operated by the user. The sensor circuit may, for example, include an open circuit underneath the handle button 142. When the handle button 142 is pressed by the user, a conductive surface becomes in contact with the open circuit, shorting it and generating a signal in the form of voltage or current in the sensor circuit, indicating that the handle button 142 has been pressed by the user and triggering a corresponding response.

Although not depicted in the drawings, in alternative implementations, the hand-held controller 1 may include a sixth input device. The sixth input device may be located on the right-side section of the handle 140, where the ring and little fingers rest when the hand-held controller 1 is grasped, as shown in FIG. 8. The sixth input device may be a button or set of buttons that are configured to be comfortably operated with the ring and little fingers of the user while the hand-held controller 1 is grasped. The sixth input device may serve for giving additional game inputs or for other purposes like, for example, configuration purposes. The sixth input device includes a sensor interface circuit (similar to the sensor interface circuits described previously) for generating a signal which indicates that the sixth input device has been operated by the user and triggers a corresponding response.

In one implementation, the hand-held controller 1 may include an accelerometer, which may be configured to detect when the hand-held controller 1 is shaken or moved abruptly by the user. This allows the user to send an additional input by shaking the controller. With this feature, the user can perform an in-game action like tossing a grenade, for example, by shaking the hand-held controller 1. The accelerometer may also have a second function when paired with the back button 160. This way, the user may perform an in-game action by shaking the controller; and a different in-game action by shaking the controller while the back button 160 is pressed. For example, the user may perform the in-game action of tossing a grenade by shaking the hand-held controller 1, and perform the in-game action of reloading when shaking the hand-held controller 1 while the back button 160 is pressed. This way, the user is able to send two different inputs with the accelerometer feature. In alternative implementations, the hand-held controller 1 may also include gyroscopic sensors, which detect the relative orientation of the controller and would allow the user to provide motion controls, by tilting the hand-held controller 1 when held by the user's hand.

In one implementation, the hand-held controller 1 includes an internal battery 250. The internal battery 250 serves to power the components included within the hand-held controller 1. The internal battery may be a lithium polymer battery, although not limited thereto. In alternative implementations, the hand-held controller 1 may include other types of batteries and/or a different number of batteries.

In one implementation, the hand-held controller 1 includes a vibration motor, or other suitable components, to provide haptic feedback to the user. This feature gives the user a real sensation of what happens in game through vibration of the hand-held controller 1 and provides a greater level of immersion.

Figure 7:
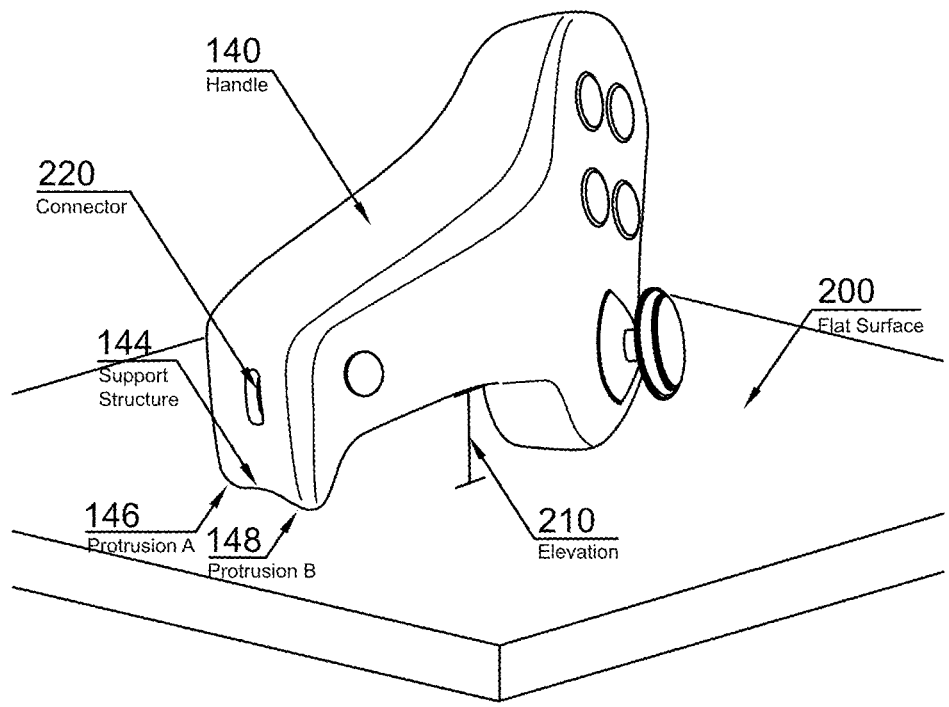
FIG. 7 is a diagram illustrating a perspective view of an exemplary implementation of the hand-held controller shown standing on one side on a flat surface.

The hand-held controller 1 may exchange data information with the gaming system via a wired connection and/or a wireless connection. In one implementation, the hand-held controller 1 includes a connector 220 located at the rear part of the handle 140, as illustrated in FIG. 7. The connector 220 may be a USB-C type connection port, although not limited thereto. In that case, the user may connect the hand-held controller 1 to the gaming system with a USB-C to USB-A type cable. Such connection may serve for both data transmission and charging of the internal battery 250. The hand-held controller 1 may also include a wireless module 240, which allows sending and receiving data to and from the gaming system wirelessly. The wireless module 240 may send and receive data without the need for any cables to be connected to the hand-held controller 1. In one implementation, the hand-held controller 1 might use a Bluetooth protocol to communicate wirelessly with the gaming system, although not limited thereto. The wireless module 240, for example, could instead use a RF system protocol that sends information wirelessly to a USB dongle, which may be directly connected to a port of the gaming system to act as a receiver. An internal battery 250 powers the components within the hand-held controller 1 in a case where the hand-held controller 1 operates wirelessly, and thus no cables are required. In one implementation, the hand-held controller 1 may include both a Bluetooth protocol and a RF system that may include a USB dongle to communicate wirelessly with the gaming system, in which case the user may decide which to use according to preference. In one implementation, the hand-held controller 1 may include interfaces for both wired and wireless connectivity to the gaming system, in which case the user may choose which mode of connection to use according to preference.

Although not depicted in the drawings, in one implementation, the hand-held controller 1 may include light emitting diodes at the rear part of the handle 140, near the connector 220, or at other suitable locations on the hand-held controller's 1 housing. The light emitting diodes may be of different colors and display information to the user, such as battery charge state, wireless pairing state, charging state, input mode states, or other information.

In one implementation, a host application is included. The host application may be installed and executed in the gaming system. The host application allows the user to perform various configuration processes related to the hand-held controller 1. For example, the user may be able to select the input modes of the various input devices included in the hand-held controller 1, like the joystick 120 first operation mode or second operation mode. The user may also be able to create, edit, save, and select profiles on button assignments; configure specific combo button presses and assignments; configure button-to-key assignments; configure buttons to function as function-adding buttons; and/or perform other configurations.

In alternative implementations, the hand-held controller 1 may include additional input, control, or interface devices on suitable locations of its housing. For example, the hand-held controller may include an on/off switch, additional light emitting diodes, buttons, and/or other input, control, or interface devices.

Figure 5:
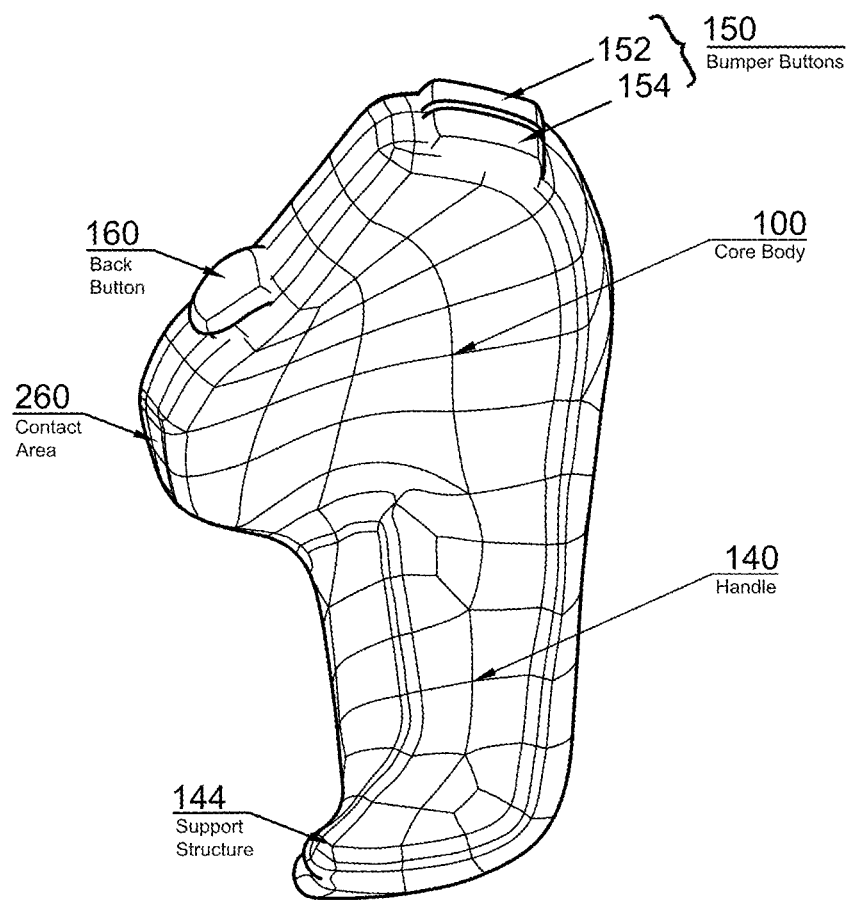
FIG. 5 is a diagram illustrating a bottom view of an exemplary implementation of the hand-held controller.
Figure 6:
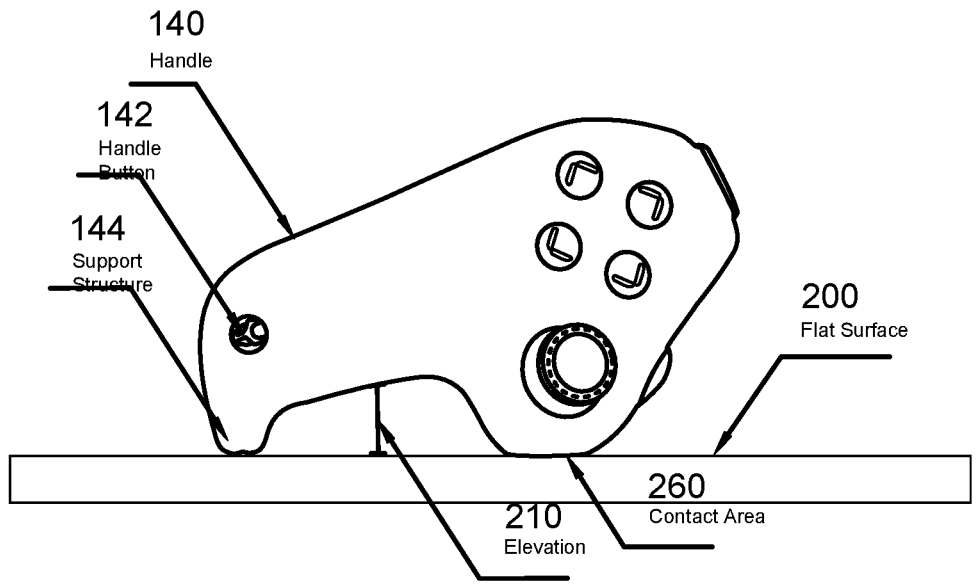
FIG. 6 is a diagram illustrating a plane view of an exemplary implementation of the hand-held controller shown standing on one side on a flat surface.
Figure 9A:
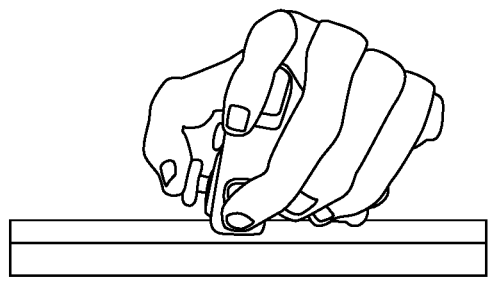
FIGS. 9A-C are diagrams illustrating three views (front, top and side) of an exemplary implementation of the hand-held controller shown being grasped by the left hand of a user while the controller is supported against a flat surface.
Figure 9B:
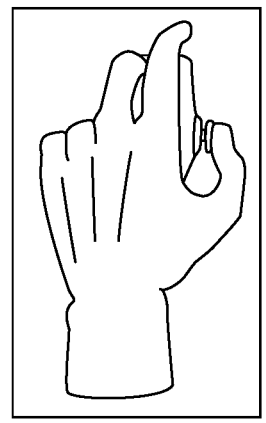
Figure 9C:
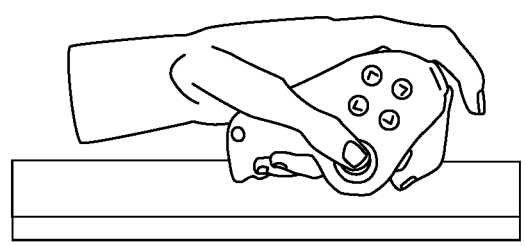

One of the advantages of the hand-held controller implementations described herein is to provide a hand-held controller device that can stand on a table or flat surface and be comfortably operated by the user while standing on such table or flat surface. With this, the user has the option to operate the hand-held controller 1 without having to carry it or hold it up, if desired, by placing the hand-held controller 1 on their table on a standing position and supporting their hand on top of the hand-held controller 1, as shown in FIGS. 9A-C. It is a further advantage of the hand-held controller implementations described herein to provide a hand-held controller device that can be picked up and released more rapidly and easily. One novel feature that makes the hand-held controller implementations described herein unique is its ability to stand on a table or flat surface. To achieve this, the hand-held controller 1 includes an innovative enclosure design that allows it to stand on a flat surface. In one implementation, the hand-held controller 1 includes a support structure 144 at the rear-most part of the handle 140, as shown in FIG. 6; and a contact area 260 at the right side of the core body 100, as shown in FIGS. 2A-B and FIG. 5. The support structure 144 protrudes from the end portion of the handle 140 towards the right side of the housing and provides points of stability for the hand-held controller 1 to stand sideways on a flat surface 200, as shown in FIG. 6 and FIG. 7. The contact area 260 may be a smooth, planar surface that is supported on the flat surface 200 when the hand-held controller 1 stands sideways on the flat surface 200, as shown in FIG. 6. To stand, the hand-held controller 1 is supported against the flat surface 200 by the support structure 144 and the contact area 260. Together, the support structure 144 and the contact area 260 provide a structure that enables the hand-held controller 1 to steadily stand on a flat surface 200 at an appropriate inclination to be comfortably grasped and operated by the user while standing, as shown in FIG. 9A. The support structure 144 may include a protrusion A 146 and a protrusion B 148 at its extremes, as shown in FIG. 7. Protrusion A 146 and protrusion B 148 are small structures that extend from the extreme of the support structure 144 and act as legs or support points to provide stability to the hand-held controller 1 when standing on a flat surface 200, as shown in FIG. 7. Protrusion A 146 and protrusion B 148 may be made of the same material that the handle 140 is made of, or of rubber or other suitable anti-sliding material that provides grip to the hand-held controller 1 to prevent it from sliding, and gives more control and comfort to the user when operating the hand-held controller 1 in a standing position. Additionally, and although not depicted in the drawings, the contact area 260 may also include small protrusions, similar to protrusion A 146 and protrusion B 148, that give stability to the hand-held controller 1 when standing. Such protrusions may be made of the same material that the core body 100 is made of, such as ABS, or anti-sliding materials such as rubber.

The support structure 144 not only provides stability and allows the hand-held controller 1 to stand, but also to gives it a certain elevation 210 over the flat surface 200, as shown in FIG. 6. This elevation 210 creates space between the handle 140 and the flat surface 200, which allows the user's fingers to grip the handle without being crushed against the flat surface 200 nor by the handle 140 when the hand-held controller 1 is supported against the flat surface 200. As shown in FIG. 9C, the elevation 210 gives space for the user's ring and little fingers to grasp the handle 140 of the hand-held controller 1 while it's standing on the flat surface 200. When standing, the user may normally grasp the hand-held controller 1 and operate its input devices. The user may also put the weight of their own hand on the hand-held controller 1 when it is supported against a flat surface 200.

The foregoing feature gives the user two important benefits. The first one is that the user has a new alternative way of positioning the hand-held controller 1 while operating it, in which they can rest their hand from holding the hand-held controller 1 up. By supporting the hand-held controller 1 against a flat surface, the user is able to operate it without carrying its weight nor the weight of their own hand, as it is supported on the hand-held controller 1. Holding a hand-held device up for long periods of time can result tiring and this feature provides the user with the option to operate the hand-held controller 1 without having to carry it. It's important to note that this mode of operation doesn't limit other forms of operation in any way. The user still has the option to not use this feature and hold the hand-held controller 1 up or position it in whichever manner they prefer.

The second benefit of the foregoing feature is that it gives the user the ability to more rapidly release and pick up the hand-held controller 1 from their table. To pick up a conventional controller, the user has to perform two movements: a first movement to grasp the controller and lift it up from the table, and then a second movement to adjust the position of their hands around the controller and into an operating position. To release the controller, a similar but inverse two-step process is required. With the standing on a flat surface feature, though, the user is able to release or to grab the hand-held controller 1 into an operating position in one single step. As can be seen by looking at FIG. 6, FIG. 7, and FIGS. 9A-C, when standing, the hand-held controller 1 rests in a position where it's ready to be grasped in the operating position. In other words, the user is able to grasp the controller in the operating position right away, without having to first lift it up. Similarly, the user can place the hand-held controller 1 in their table without first having to accommodate their hand out of the operating position. As it is well-known in the industry, being able to rapidly free one's hand and get back into action is often required to perform other tasks like grabbing a smartphone, typing on the keyboard, grabbing a drink, or any other tasks that require one or both hands to be free. This feature is beneficial because it allows the user to more rapidly free their hand when needed, and more rapidly get back into action by grasping a controller that is readily positioned to be grasped in an operating position.

In one implementation, the hand-held controller 1 is configured to be grasped with the left hand of the user. The user may grasp the hand-held controller 1 by gripping the handle 140 with the little and ring fingers, placing the middle finger around the back side of the core body 100 for support and operation of the back button 160, and placing the index finger around the left side of the core body 100 for operation of the bumper buttons 150, as shown in FIG. 8. Nonetheless, the grasping form is determined by preference of the user and may vary. Optionally, the user could use the middle finger to grasp the handle 140 along with the little and ring fingers, or to operate the bumper buttons 150 along with the index finger.

An alternative implementation of the hand-held controller described herein may be a mirrored version of the hand-held controller 1, configured to be grasped by the right hand of the user instead of the left hand. In such a case a mouse would generally be operated with the left hand of the user.

In one implementation, the hand-held controller 1 includes a grip surface that covers the bottom portion and side portions of the core body 100 and handle 140, which are shown in FIG. 5. The grip surface serves to give the user increased grip and comfort when grasping the hand-held controller 1. The grip surface may be a textured surface that includes tiny protrusions disposed in a pattern, which give a texture to the housing's surface and increase its grip. Alternatively, the grip surface may be a surface made of rubber or other suitable materials. Optionally, the grip surface may be made of sweat-absorbing materials. The grip surface may cover locations where the user's hand makes contact with the housing when the hand-held controller 1 is grasped.

In one implementation, the hand-held controller includes a strap attached to the side of the controller's enclosure that the user can use to secure the controller to their hand. In this way, the user does not have to hold the controller with their fingers. In various versions, the strap can be adjustable so as to increase or decrease how tight the strap fits on the user's hand. In addition, in various versions, the strap is detachable from the hand-held controller.

To operate the hand-held controller 1, the user may grasp it comfortably with one hand and operate the input devices described herein with their fingers. The hand-held controller implementations described herein are meant to be used along with a mouse and in replacement of the keyboard. In this sense, the user should generally operate the hand-held controller 1 with one hand while operating a mouse with the other hand. However, the user may operate the hand-held controller 1 without also operating a mouse if they prefer. The top buttons 130 and joystick 120 presented in one or more implementations are configured to be operated by the user's thumb. The bumper buttons 150 presented in one or more implementations are configured to be operated with the index finger or, optionally, with both the index and middle fingers. The back button 160 presented in one or more implementations is configured to be operated with the middle finger. The handle is configured to be grasped with the little and ring fingers or, optionally, with the little, ring, and middle fingers. To release the hand-held controller 1, the user may place the hand-held controller 1 on a table or a flat surface in a standing position, as shown in FIG. 6, to free their hand to perform other tasks when needed. Optionally, the user can place the hand-held controller 1 on a table or a flat surface in other positions. The user may also quickly pick up the hand-held controller 1 back again, as it readily stands in a position in which it can be grasped in an operating position. The user may operate the hand-held controller 1 while holding it up with his hand; supporting it against their lap, chair's arm rest, or flat surface like a table; or holding it in whichever position or manner they prefer.

Figure 10:
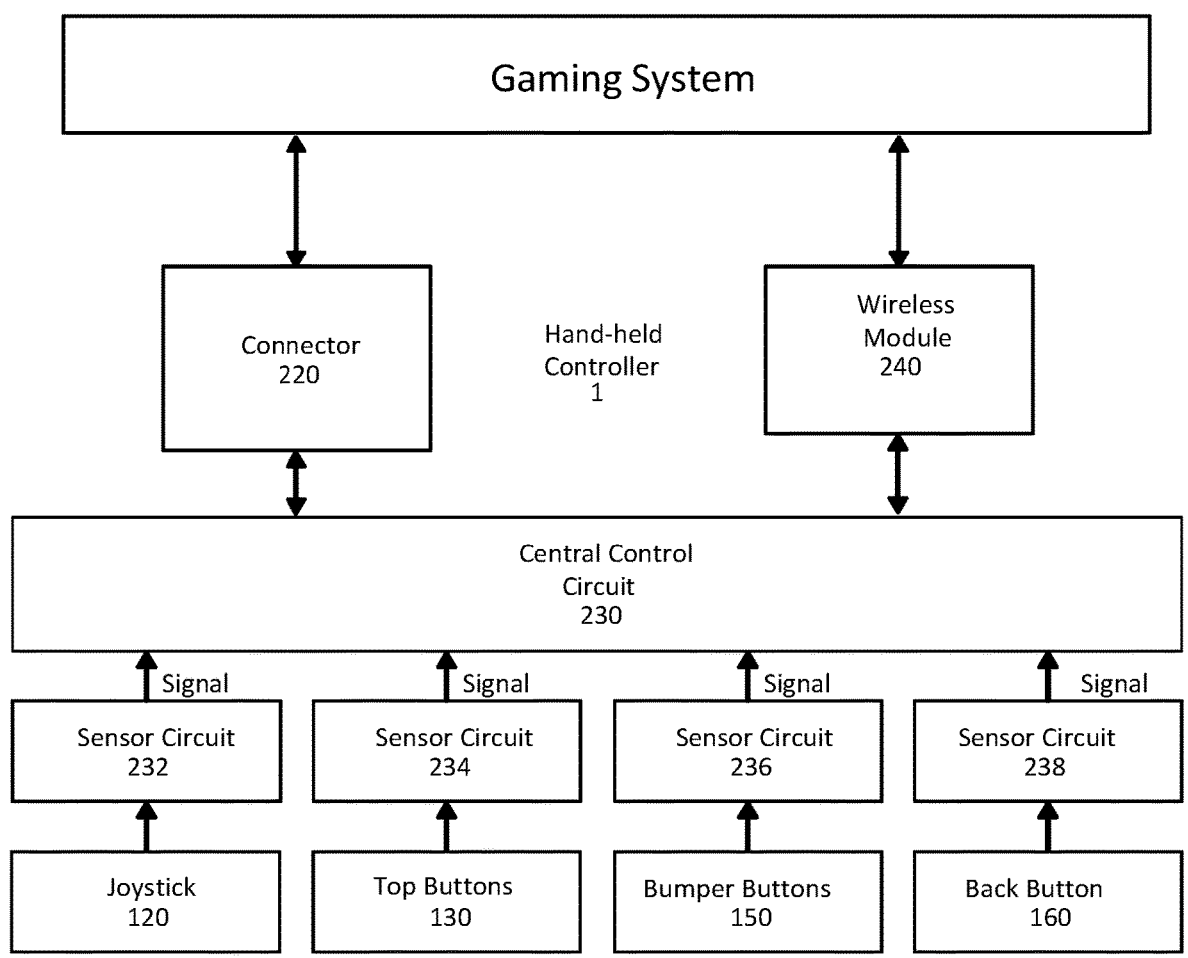
FIG. 10 is a schematic block diagram of an exemplary implementation of the hand-held controller.

An example schematic block diagram of the hand-held controller 1 is shown in FIG. 10. In one implementation, the hand-held controller 1 includes a central control circuit 230; sensor circuits 232, 234, 236, and 238, which correspond the joystick 120, top buttons 130, bumper buttons 150, and back button 160 input devices, respectively; a wireless communication interface 240; and a connector 220. This example schematic block diagram is presented with the purpose of exemplification and should not be regarded as limiting. Other components like an internal battery 250, an accelerometer, a vibration motor, a memory unit, or different and/or fewer or additional components may be included in alternative implementations.

Each input device is associated with a corresponding sensor circuit. A sensor circuit may include, for example, an open circuit, or set of open circuits, which is shorted when a corresponding push button is pressed by the user, triggering a signal in the form of a current or voltage. When operated by the user, the input devices 120, 132, 134, 136, 138, 152, 154, and 160 generate a signal in the form of a current or voltage in their corresponding sensor circuit. Each one of the input devices generates its own signal, which is different and independent from the signals generated by other input devices. For example, when pressed, the top button 132 generates a signal that is different and independent from the signal that is generated when the top button 134 is pressed. The generated signals are sent from the corresponding sensor circuit to a central control circuit 230. The central control circuit 230 detects which specific input device has been operated by the user. For example, the central control circuit 230 may detect when the top button 136 is pressed by the user by receiving a signal from the sensor circuit 234, which is generated by the press of the top button 136. The central control circuit 230 may also detect, by receiving a corresponding signal from the sensor circuit 232, how much and in what direction the joystick 120 is tilted by the user. The central control circuit 230 receives and processes the signals received from the sensor circuits 232, 234, 236, and 238. The central control circuit 230 determines and processes which of the input devices are being operated by the user as well as the input mode and configuration they are set to, and generates corresponding output data. The central control circuit 230 outputs such data to either the connector module 220 or the wireless module 240, depending on which is currently connecting the hand-held controller 1 to the gaming system. The output data is then sent to the gaming system, triggering a corresponding response to the game.

3.0 Other Advantages and Implementations

While the hand-held controller has been described in more detail by specific reference to implementations thereof, it is understood that variations and modifications thereof can be made without departing from the true spirit and scope of the sensor. For example, although the hand-held controller implementations described herein are generally related to giving input to videogames, it is not limited to that purpose. Since the hand-held controller 1 can emulate a keyboard on certain operation modes, it may also be used in replacement of the keyboard to interact with pieces of software that are not videogames. For example, in creative or design software such as Fusion 360®, developed and published by Autodesk Inc.; or Adobe® Photoshop®, developed and published by Adobe Inc.; keyboard shortcuts are generally used to provide quick access to certain functions within the software. For example, the keyboard key "C" may provide quick access to the 'Center Diameter Circle' tool in Fusion 360®, and the keyboard key "W" may provide quick access to the 'Magic Wand' tool in Adobe® Photoshop®. These shortcuts allow the user to access certain tools without having to manually click them, by simply pressing a keyboard key. Generally, during operation of such creative programs, one hand operates the mouse while the other performs keyboard shortcuts. Unfortunately, there are certain issues that emerge from performing such shortcuts with a keyboard. One of the problems users face is that keyboard shortcut keys can be located at a considerable distance from one another, like the keyboard keys "C" and "P", for example. Since one hand is operating the mouse, this means that users generally are forced to look down to the keyboard to press the correct shortcut keys and/or move their left hand along the keyboard, which is inconvenient and disrupts the workflow.

However, shortcuts that are generally performed with a keyboard could instead be performed with the hand-held controller 1. The advantage of using the hand-held controller 1 instead of a keyboard is that the user can perform more than 20 shortcuts or in general any function input with buttons that are located at the reach of their hand. By being able to feel where each of those inputs is located, the user can easily perform keyboard shortcuts or any function input with minimal finger movement, without having to move the wrist or hand, and without having to take their look down to a keyboard and away from the screen. Moreover, by using the hand-held controller 1 instead of a keyboard, the user can position their hand in whichever position they find most comfortable instead of being limited to a fixed position.

It is further noted that any or all of the implementations that are described in the present document and any or all of the implementations that are illustrated in the accompanying drawings may be used and thus claimed in any combination desired to form additional hybrid implementations. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What has been described above includes example implementations. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications, and variations that fall within the spirit and scope of the appended claims.

In regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter.

There are multiple ways of realizing the foregoing implementations (such as an appropriate application programming interface (API), tool kit, driver code, operating system, control, standalone or downloadable software object, or the like), which enable applications and services to use the implementations described herein. The claimed subject matter contemplates this use from the standpoint of an API (or other software object), as well as from the standpoint of a software or hardware object that operates according to the implementations set forth herein. Thus, various implementations described herein may have aspects that are wholly in hardware, or partly in hardware and partly in software, or wholly in software.

The aforementioned hand-held controller implementations have been described with respect to interaction between several components. It will be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (e.g., hierarchical components).

Additionally, it is noted that one or more components may be combined into a single component providing aggregate functionality or divided into several separate sub-components. Any components described herein may also interact with one or more other components not specifically described herein but generally known by those of skill in the art.

4.0 Exemplary Operating Environments

Figure 11:
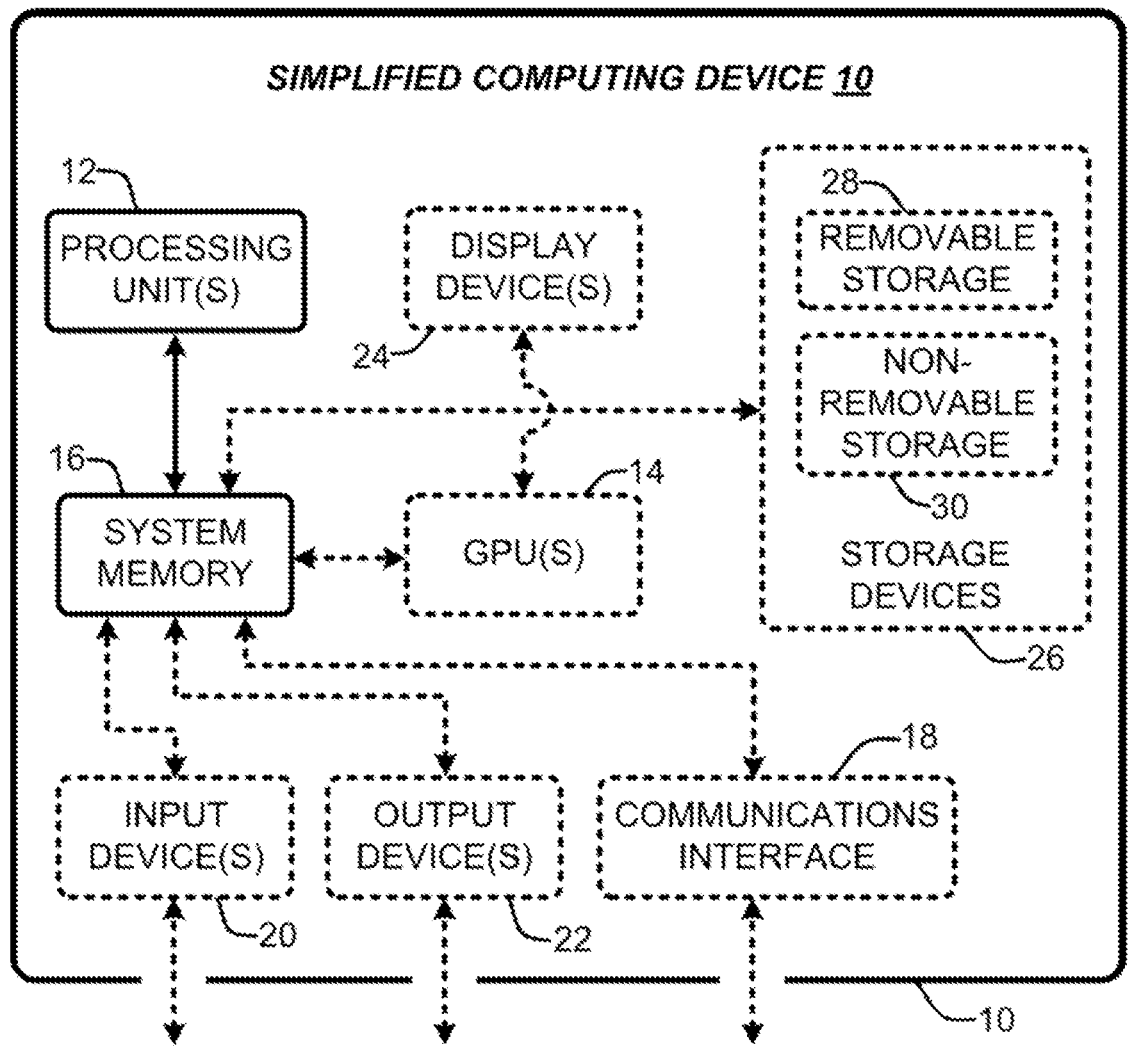
FIG. 11 is a diagram illustrating a simplified example of a general-purpose computer system on which various aspects of the hand-held controller, as described herein, may be realized.

The previously described electronic components of the hand-held controller implementations can employ numerous types of general purpose or special purpose computing system environments or configurations. FIG. 11 illustrates a simplified example of a general-purpose computer system on which various implementations and elements of the entity functional area and product use identification, as described herein, may be implemented. It is noted that any boxes that are represented by broken or dashed lines in the simplified computing device 10 shown in FIG. 11 represent alternate implementations of the simplified computing device. As described below, any or all of these alternate implementations may be used in combination with other alternate implementations that are described throughout this document. The simplified computing device 10 is typically found in devices having at least some minimum computational capability such as personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, and audio or video media players.

To allow a device to realize the hand-held controller implementations described herein, the device should have a sufficient computational capability and system memory to enable basic computational operations. In particular, the computational capability of the simplified computing device 10 shown in FIG. 11 is generally illustrated by one or more processing unit(s) 12, and may also in some implementations include one or more graphics processing units (GPUs) 14, either or both in communication with system memory 16. Note that that the processing unit(s) 12 of the simplified computing device 10 may be specialized microprocessors (such as a digital signal processor (DSP), a very long instruction word (VLIW) processor, a field-programmable gate array (FPGA), or other micro-controller) or can be conventional central processing units (CPUs) having one or more processing cores.

In addition, the simplified computing device 10 may also include other components, such as, for example, a communications interface 18. The simplified computing device 10 may also include one or more conventional computer input devices 20 (e.g., touchscreens, touch-sensitive surfaces, pointing devices, keyboards, audio input devices, voice or speech-based input and control devices, video input devices, haptic input devices, devices for receiving wired or wireless data transmissions, and the like) or any combination of such devices.

Similarly, various interactions with the simplified computing device 10 and with any other component or feature of the hand-held controller implementations described herein, including input, output, control, feedback, and response to one or more users or other devices or systems associated with the hand-held controller implementations, are enabled by a variety of Natural User Interface (NUI) scenarios. The NUI techniques and scenarios enabled by the hand-held controller implementations include, but are not limited to, interface technologies that allow one or more users user to interact with the hand-held controller implementations in a "natural" manner, free from artificial constraints imposed by input devices such as mice, keyboards, remote controls, and the like.

Such NUI implementations are enabled by the use of various techniques including, but not limited to, using NUI information derived from user speech or vocalizations captured via microphones or other sensors (e.g., speech and/or voice recognition). Such NUI implementations are also enabled by the use of various techniques including, but not limited to, information derived from a user's facial expressions and from the positions, motions, or orientations of a user's hands, fingers, wrists, arms, legs, body, head, eyes, and the like, where such information may be captured using various types of 2D or depth imaging devices such as stereoscopic or time-of-flight camera systems, infrared camera systems, RGB (red, green and blue) camera systems, or the like, or any combination of such devices. Further examples of such NUI implementations include, but are not limited to, NUI information derived from touch and stylus recognition, gesture recognition (both onscreen and adjacent to the screen or display surface), air or contact-based gestures, user touch (on various surfaces, objects or other users), hover-based inputs or actions, and the like. Such NUI implementations may also include, but are not limited, the use of various predictive machine intelligence processes that evaluate current or past user behaviors, inputs, actions, etc., either alone or in combination with other NUI information, to predict information such as user intentions, desires, and/or goals. Regardless of the type or source of the NUI-based information, such information may then be used to initiate, terminate, or otherwise control or interact with one or more inputs, outputs, actions, or functional features of the entity functional area and product use identification implementations described herein.

However, it should be understood that the aforementioned exemplary NUI scenarios may be further augmented by combining the use of artificial constraints or additional signals with any combination of NUI inputs. Such artificial constraints or additional signals may be imposed or generated by input devices such as mice, keyboards, and remote controls, or by a variety of remote or user worn devices such as accelerometers, electromyography (EMG) sensors for receiving myoelectric signals representative of electrical signals generated by user's muscles, heart-rate monitors, galvanic skin conduction sensors for measuring user perspiration, wearable or remote biosensors for measuring or otherwise sensing user brain activity or electric fields, wearable or remote biosensors for measuring user body temperature changes or differentials, and the like. Any such information derived from these types of artificial constraints or additional signals may be combined with any one or more NUI inputs to initiate, terminate, or otherwise control or interact with one or more inputs, outputs, actions, or functional features of the hand-held controller implementations described herein.

The simplified computing device 10 may also include other optional components such as one or more conventional computer output devices 22 (e.g., display device(s) 24, audio output devices, video output devices, devices for transmitting wired or wireless data transmissions, and the like). Note that typical communications interfaces 18, input devices 20, output devices 22, and storage devices 26 for general-purpose computers are well known to those skilled in the art, and will not be described in detail herein.

The simplified computing device 10 shown in FIG. 11 may also include a variety of computer-readable media. Computer-readable media can be any available media that can be accessed by the computer 10 via storage devices 26, and can include both volatile and nonvolatile media that is either removable 28 and/or non-removable 30, for storage of information such as computer-readable or computer-executable instructions, data structures, programs, sub-programs, or other data. Computer-readable media includes computer storage media and communication media. Computer storage media refers to tangible computer-readable or machine-readable media or storage devices such as digital versatile disks (DVDs), blu-ray discs (BD), compact discs (CDs), floppy disks, tape drives, hard drives, optical drives, solid state memory devices, random access memory (RAM), read-only memory (ROM), electrically erasable programmable read-only memory (EEPROM), CD-ROM or other optical disk storage, smart cards, flash memory (e.g., card, stick, and key drive), magnetic cassettes, magnetic tapes, magnetic disk storage, magnetic strips, or other magnetic storage devices. Further, a propagated signal is not included within the scope of computer-readable storage media.

Retention of information such as computer-readable or computer-executable instructions, data structures, programs, sub-programs, and the like, can also be accomplished by using any of a variety of the aforementioned communication media (as opposed to computer storage media) to encode one or more modulated data signals or carrier waves, or other transport mechanisms or communications protocols, and can include any wired or wireless information delivery mechanism. Note that the terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, sub-programs, and/or computer program products embodying some or all of the various hand-held controller implementations described herein, or portions thereof, may be stored, received, transmitted, or read from any desired combination of computer-readable or machine-readable media or storage devices and communication media in the form of computer-executable instructions or other data structures. Additionally, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, or media.

Some aspects of the hand-held controller implementations described herein may be further described in the general context of computer-executable instructions, such as programs, sub-programs, being executed by a computing device. Generally, sub-programs include routines, programs, objects, components, data structures, and the like, that perform particular tasks or implement particular abstract data types. Some aspects of the hand-held controller implementations may also be practiced in distributed computing environments where tasks are performed by one or more remote processing devices, or within a cloud of one or more devices, that are linked through one or more communications networks. In a distributed computing environment, sub-programs may be located in both local and remote computer storage media including media storage devices. Additionally, the aforementioned instructions may be implemented, in part or in whole, as hardware logic circuits, which may or may not include a processor. Still further, aspects of the hand-held controller implementations described herein can be virtualized and realized as a virtual machine running on a computing device such as any of those described previously. In addition, multiple entity functional area and product use identification virtual machines can operate independently on the same computer device.

Alternatively, or in addition, the functionality described herein can be performed, at least in part, by one or more hardware logic components. For example, and without limitation, illustrative types of hardware logic components that can be used include FPGAs, application-specific integrated circuits (ASICs), application-specific standard products (ASSPs), system-on-a-chip systems (SOCs), complex programmable logic devices (CPLDs), and so on.

Wherefore, what is claimed is:

1. A hand-held controller that is operated with one hand of a user and which interfaces with and provides inputs to a video game running on a computing device, comprising:
a housing configured to be grasped with one hand of the user;
a directional input device accessible by the user on the exterior surface of the housing which causes a signal indicative of a direction to be sent to a central controller whenever the user manipulates the directional input device in a manner indicative of a direction;
at least seven video game input devices accessible by the user on the exterior surface of the housing each of which causes a signal indicative of the activation of that input device to be sent to the central controller whenever that input device is activated by the user;
two function-adding input devices accessible by the user on the exterior surface of the housing each of which causes a signal indicative of the activation of that function-adding input device to be sent to the central controller whenever that function-adding input device is activated by the user, and wherein whenever a function-added input device signal is received by the central controller while one or more of the video game input devices is activated, the central controller changes a prescribed video game action input signal associated with the activation of the one or more video game input devices to a different prescribed video game action input signal associated with the activation of the one or more video game input devices in conjunction with the activation of the function-adding input device corresponding to the received function-added input device signal; and
the central controller which interfaces with and provides video game input signals to the computing device running the video game, wherein
the central controller receives activation signals and for each activation signal or coincident activation signals received, assigns a prescribed video game action input signal associated with the particular activation signal or coincident activation signals received and sends the assigned video game action input signal to said computing device via one or more communication interfaces, and wherein
the central controller receives direction signals and for each direction signal received, assigns a prescribed video game direction input signal associated with the particular direction signal received and sends the assigned video game direction signal to said computing device via one or more communication interfaces, and wherein
more than 20 different video game action input signals can be generated by the central controller in response to the activation of the video game input devices and function-adding input devices alone or in combination.

2. The hand-held controller of claim 1, wherein the directional input device additionally operates as video game input device whenever the directional input device is manipulated in a prescribed manner that is not indicative of a direction.

3. The hand-held controller of claim 1, wherein each function-adding input device additionally operates as video game input device whenever the function-adding input device is activated without concurrently activating one or more of the video game input devices.

4. The hand-held controller of claim 1, wherein whenever the central controller receives coincident activation signals associated with two or more video game input devices, the central controller assigns a prescribed video game action input signal associated with the particular coincident activation signals received that is different from a prescribed video game action input signal that would be assigned if an activation signal associated with any one or a different combination of the two or more video game input devices was received instead.

5. The hand-held controller of claim 1, wherein the prescribed video game direction input signal associated with a particular direction signal received by the central controller is one of an analog direction signal, or a digital direction signal, or a computer mouse direction signal.

6. The hand-held controller of claim 1, further comprising a power switch device that whenever activated when the hand-held controller is powered turns the controller power off, and whenever the hand-held controller is not powered turns the controller power on.

7. The hand-held controller of claim 1, further comprising a profile selection device that whenever activated changes the profile of the hand-held controller, wherein the profile of the hand-held controller is a prescribed set of correspondences between a particular activation signal or coincident activation signals and the video game action input associated activation signal or signals.

8. The hand-held controller of claim 1, further comprising a direction signal selection device that whenever activated changes the prescribed video game direction input signals associated with the direction signals to one of analog direction signals, or digital direction signals, or mouse direction signals.

9. The hand-held controller of claim 1, wherein the directional input device, the video game input devices, and the function-adding input devices are located on the exterior surface of the housing so that the user is able to access said input devices with minimal finger displacement and wrist movement.

10. The hand-held controller of claim 1, wherein there are sufficient video game input devices and function-adding input devices to replace a keyboard as an input device to a video game running on said computing device.

11. The hand-held controller of claim 1, wherein the housing comprises:
a core body which includes the directional input device, the video game input devices and the function-adding input devices which are positioned to be reachable by the user's thumb, index finger and middle finger; and
a handle which projects from the core body and which the user grasps with at least their little and ring fingers.

12. The hand-held controller of claim 11, wherein the core body has multiple, differently oriented, exterior faces, and wherein some of the video game input devices, or function-adding input devices, or both, are accessible by the user on a different exterior face or faces than others of the input devices.

13. The hand-held controller of claim 11, wherein the core body has multiple, differently oriented, exterior faces, comprising:
a first face which is accessible by at least the thumb of the user's hand, and which comprises the directional input device and ones of the video game input devices;
a second face which is accessible by at least the index finger of the user's hand, and which comprises other ones of the video game input devices; and
a third face which is accessible by at least the middle finger of the user's hand, and which comprises at least one function-adding input device.

14. The hand-held controller of claim 11, wherein the handle comprises at least one video game input device or at least one function-adding input device or a combination of at least one video game input device and at least one function-adding input device, which are positioned to be reachable by at least the user's little and ring fingers.

15. The hand-held controller of claim 1, further comprising a strap which is attached to the housing and configured to secure the user's hand to controller.

16. A hand-held controller that is operated with one hand of a user and which interfaces with and provides inputs to a video game running on a computing device, comprising:
a housing configured to be grasped with one hand of the user;
a directional input device accessible by the user on the exterior surface of the housing which causes a signal indicative of a direction to be sent to a central controller whenever the user manipulates the directional input device in a manner indicative of a direction, wherein
the directional input device comprises a circuit board disposed within the housing and the user manipulable interface accessible by the user on the exterior surface of the housing, and wherein
the directional input device is structurally independent from other components located on or within the housing, such that the directional input device can be removed and replaced without removing or compromising the other components;
a plurality of video game input devices accessible by the user on the exterior surface of the housing each of which causes a signal indicative of the activation of that input device to be sent to the central controller whenever that input device is activated by the user;
at least one function-adding input device accessible by the user on the exterior surface of the housing each of which causes a signal indicative of the activation of that function-adding input device to be sent to the central controller whenever that function-adding input device is activated by the user, and wherein whenever a function-added input device signal is received by the central controller while one or more of the video game input devices is activated, the central controller changes a prescribed video game action input signal associated with the activation of the one or more video game input devices to a different prescribed video game action input signal associated with the activation of the one or more video game input devices in conjunction with the activation of the function-adding input device corresponding to the received function-added input device signal; and
the central controller which interfaces with and provides video game input signals to the computing device running the video game, wherein
the central controller receives activation signals and for each activation signal or coincident activation signals received, assigns a prescribed video game action input signal associated with the particular activation signal or coincident activation signals received and sends the assigned video game action input signal to said computing device via one or more communication interfaces, and wherein
the central controller receives direction signals and for each direction signal received, assigns a prescribed video game direction input signal associated with the particular direction signal received and sends the assigned video game direction signal to said computing device via one or more communication interfaces.

17. A hand-held controller that is operated with one hand of a user and which interfaces with and provides inputs to a video game running on a computing device, comprising:

a housing configured to be grasped with one hand of the user, comprising, a core body and a single handle which projects from the core body, wherein the core body comprises a contact area on one side the housing and the handle comprises a support structure at a distal end of the handle on said one side of the housing which allows the hand-held controller to rest on a flat surface with a portion to the handle being elevated from the flat surface so that the handle is graspable by one hand of the user and the user is able to fully operate the hand-held controller with said one hand while the hand-held controller rests on the flat surface;

a directional input device accessible by the user on the exterior surface of the housing which causes a signal indicative of a direction to be sent to a central controller whenever the user manipulates the directional input device in a manner indicative of a direction;

a plurality of video game input devices accessible by the user on the exterior surface of the housing each of which causes a signal indicative of the activation of that input device to be sent to the central controller whenever that input device is activated by the user;

at least one function-adding input device accessible by the user on the exterior surface of the housing each of which causes a signal indicative of the activation of that function-adding input device to be sent to the central controller whenever that function-adding input device is activated by the user, and wherein whenever a function-added input device signal is received by the central controller while one or more of the video game input devices is activated, the central controller changes a prescribed video game action input signal associated with the activation of the one or more video game input devices to a different prescribed video game action input signal associated with the activation of the one or more video game input devices in conjunction with the activation of the function-adding input device corresponding to the received function-added input device signal; and the central controller which interfaces with and provides video game input signals to the computing device running the video game, wherein the central controller receives activation signals and for each activation signal or coincident activation signals received, assigns a prescribed video game action input signal associated with the particular activation signal or coincident activation signals received and sends the assigned video game action input signal to said computing device via one or more communication interfaces, and wherein the central controller receives direction signals and for each direction signal received, assigns a prescribed video game direction input signal associated with the particular direction signal received and sends the assigned video game direction signal to said computing device via one or more communication interfaces.

* * * * *